US012074558B2

(12) United States Patent
Neal et al.

(10) Patent No.: US 12,074,558 B2
(45) Date of Patent: Aug. 27, 2024

(54) MOUNTING SYSTEM FOR MOUNTING SOLAR PANEL MODULES

(71) Applicant: Unirac Inc., Albuquerque, NM (US)

(72) Inventors: Jonathan Neal, Albuquerque, NM (US); Todd Ganshaw, Albuquerque, NM (US); Nathan Schuit, Moriarty, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 17/697,668

(22) Filed: Mar. 17, 2022

(65) Prior Publication Data

US 2022/0345074 A1    Oct. 27, 2022

Related U.S. Application Data

(60) Provisional application No. 63/162,454, filed on Mar. 17, 2021.

(51) Int. Cl.
*H02S 20/22* (2014.01)
*F24S 25/61* (2018.01)
*H02S 30/10* (2014.01)

(52) U.S. Cl.
CPC .............. *H02S 20/22* (2014.12); *F24S 25/61* (2018.05); *H02S 30/10* (2014.12)

(58) Field of Classification Search
CPC .. F24S 25/33; F24S 25/61; F24S 25/65; F24S 25/636; F24S 2025/021; F24S 2025/6005; F24S 2025/6007; H02S 20/10; H02S 20/22; H02S 20/23; H02S 30/00
See application file for complete search history.

(56) References Cited

U.S. PATENT DOCUMENTS

| | | | |
|---|---|---|---|
| 5,203,135 A * | 4/1993 | Bastian | F16B 7/0413 403/292 |
| 6,536,729 B1 * | 3/2003 | Haddock | E04D 3/38 52/204.55 |
| 8,387,319 B1 * | 3/2013 | Gilles-Gagnon | F24S 25/33 52/173.3 |
| 8,695,290 B1 * | 4/2014 | Kim | F24S 25/67 52/843 |
| 9,422,957 B2 * | 8/2016 | Dinh | F24S 25/636 |
| 9,912,284 B2 * | 3/2018 | Svec | H02S 20/25 |
| 9,923,509 B2 * | 3/2018 | Almy | H02S 20/23 |

(Continued)

FOREIGN PATENT DOCUMENTS

| | | | |
|---|---|---|---|
| CN | 204376810 U | * | 6/2015 |
| CN | 108306585 A | * | 7/2018 |

(Continued)

OTHER PUBLICATIONS

The PCT Search Report and Written Opinion mailed Jul. 27, 2022 for PCT Application No. PCT/US22/20821, 11 pages.

(Continued)

*Primary Examiner* — Jessie T Fonseca
(74) *Attorney, Agent, or Firm* — Lee & Hayes, P.C.; Mike Merkelbach

(57) ABSTRACT

A mounting system includes a base to mount to a surface, a mounting bracket to mount over the base and to the surface, a clamp for attaching to the mounting bracket and securing a rail segment, and a bonding clamp to mount to the rail segment and secure a solar panel module thereto.

48 Claims, 20 Drawing Sheets

(56) References Cited

U.S. PATENT DOCUMENTS

| | | | |
|---|---|---|---|
| 10,218,305 B1* | 2/2019 | Schrock | H02S 20/20 |
| 10,340,838 B2* | 7/2019 | Schuit | F24S 25/636 |
| 10,951,157 B1* | 3/2021 | Young | H02S 30/10 |
| 11,296,648 B1* | 4/2022 | Jasmin | F16B 5/0233 |
| 11,377,840 B2* | 7/2022 | Stephan | F16B 7/0413 |
| 11,463,040 B2 | 10/2022 | Affentranger, Jr. | |
| 2008/0095591 A1* | 4/2008 | Wu | F16B 37/046 |
| | | | 411/161 |
| 2010/0276558 A1* | 11/2010 | Faust | F24S 25/12 |
| | | | 248/316.1 |
| 2011/0247295 A1 | 10/2011 | Stearns et al. | |
| 2013/0133270 A1* | 5/2013 | West | F24S 25/61 |
| | | | 52/705 |
| 2014/0042286 A1* | 2/2014 | Jaffari | F24S 25/30 |
| | | | 248/316.4 |
| 2014/0110543 A1* | 4/2014 | Aliabadi | H02S 20/20 |
| | | | 248/201 |
| 2016/0043689 A1* | 2/2016 | McPheeters | H02S 30/10 |
| | | | 248/287.1 |
| 2016/0134230 A1 | 5/2016 | Meine | |
| 2016/0204732 A1* | 7/2016 | Thomas | H02S 20/30 |
| | | | 248/274.1 |
| 2016/0226435 A1* | 8/2016 | Almy | F24S 25/636 |
| 2016/0248367 A1* | 8/2016 | Almy | F24S 25/00 |
| 2016/0248368 A1* | 8/2016 | Seery | F24S 25/61 |
| 2016/0248369 A1* | 8/2016 | Almy | F24S 25/61 |
| 2016/0308487 A1* | 10/2016 | Molina | F24S 25/33 |
| 2016/0344338 A1* | 11/2016 | Schutz | H02S 40/34 |
| 2017/0102167 A1* | 4/2017 | Stephan | H02S 20/23 |
| 2017/0279403 A1* | 9/2017 | Seery | H02S 20/23 |
| 2018/0167023 A1* | 6/2018 | Meine | H02S 20/23 |
| 2018/0266729 A1* | 9/2018 | Dai | F24S 25/65 |
| 2018/0274238 A1* | 9/2018 | Aliabadi | E04D 13/00 |
| 2019/0068110 A1* | 2/2019 | McPheeters | F24S 25/634 |
| 2019/0093340 A1* | 3/2019 | Meine | E04B 1/6801 |
| 2019/0131917 A1* | 5/2019 | Tomolillo | F24S 25/613 |
| 2020/0116191 A1* | 4/2020 | Uppu | H02S 20/00 |
| 2020/0259448 A1 | 8/2020 | Schuit et al. | |
| 2020/0309184 A1* | 10/2020 | Schuit | F16B 37/045 |
| 2021/0156413 A1* | 5/2021 | Stephan | F16B 5/0068 |
| 2021/0285596 A1* | 9/2021 | Affentranger, Jr. | F16M 13/02 |
| 2021/0285689 A1* | 9/2021 | Affentranger, Jr. | F24S 25/30 |
| 2022/0099136 A1* | 3/2022 | Meine | E04D 15/04 |
| 2022/0173692 A1* | 6/2022 | Schuit | H02S 20/30 |

FOREIGN PATENT DOCUMENTS

| | | | | |
|---|---|---|---|---|
| CN | 108306609 A | * | 7/2018 | H02S 30/00 |
| CN | 208797873 U | * | 4/2019 | |
| CN | 112019135 A | * | 12/2020 | H02S 20/23 |
| CN | 113794431 A | * | 12/2021 | |
| DE | 202011001761 U1 | * | 5/2011 | F24J 2/5203 |
| DE | 202014102470 U1 | * | 9/2014 | F16B 7/187 |
| DE | 102020206810 B3 | * | 8/2021 | F24S 25/636 |
| EP | 3364124 A1 | * | 8/2018 | F24S 25/613 |
| JP | 2014163080 A | * | 9/2014 | F24J 2/5203 |

OTHER PUBLICATIONS

PCT International Preliminary Report on Patentability for PCT Application No. PCT/US2022/020821, mailed Sep. 28, 2023, 8 pages.

Invitation to Pay Additional Fees for PCT Application No. PCT/US22/20821, mailed May 9, 2022, 2 pages.

* cited by examiner

MOUNTING SYSTEM FOR MOUNTING SOLAR PANEL MODULES

RELATED APPLICATIONS

This application claims priority to U.S. Provisional Patent Application No. 63/162,454, filed on Mar. 17, 2021, the entire contents of which are incorporated herein by reference.

BACKGROUND

As the solar energy industry continues to grow, the equipment to mount photovoltaic (PV) modules on different types of structures and/or locations continues to adapt and improve as well. Conventional PV module mounting assemblies are frequently designed with a specific use according to a particular surface structure. As such, conventional mounting assemblies frequently lack the ability to be implemented on multiple different structures and/or locations. Despite the numerous existing systems for mounting solar panel modules, there is room for improvement.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a mounting system of components for mounting a solar panel module ("module") to a roof or other surface. The system and/or one or more components thereof may alternatively be referred to as an apparatus. Features of the system are further described as shown in the figures and expressed in the claims listing.

Illustrative Embodiments

Figure 1:
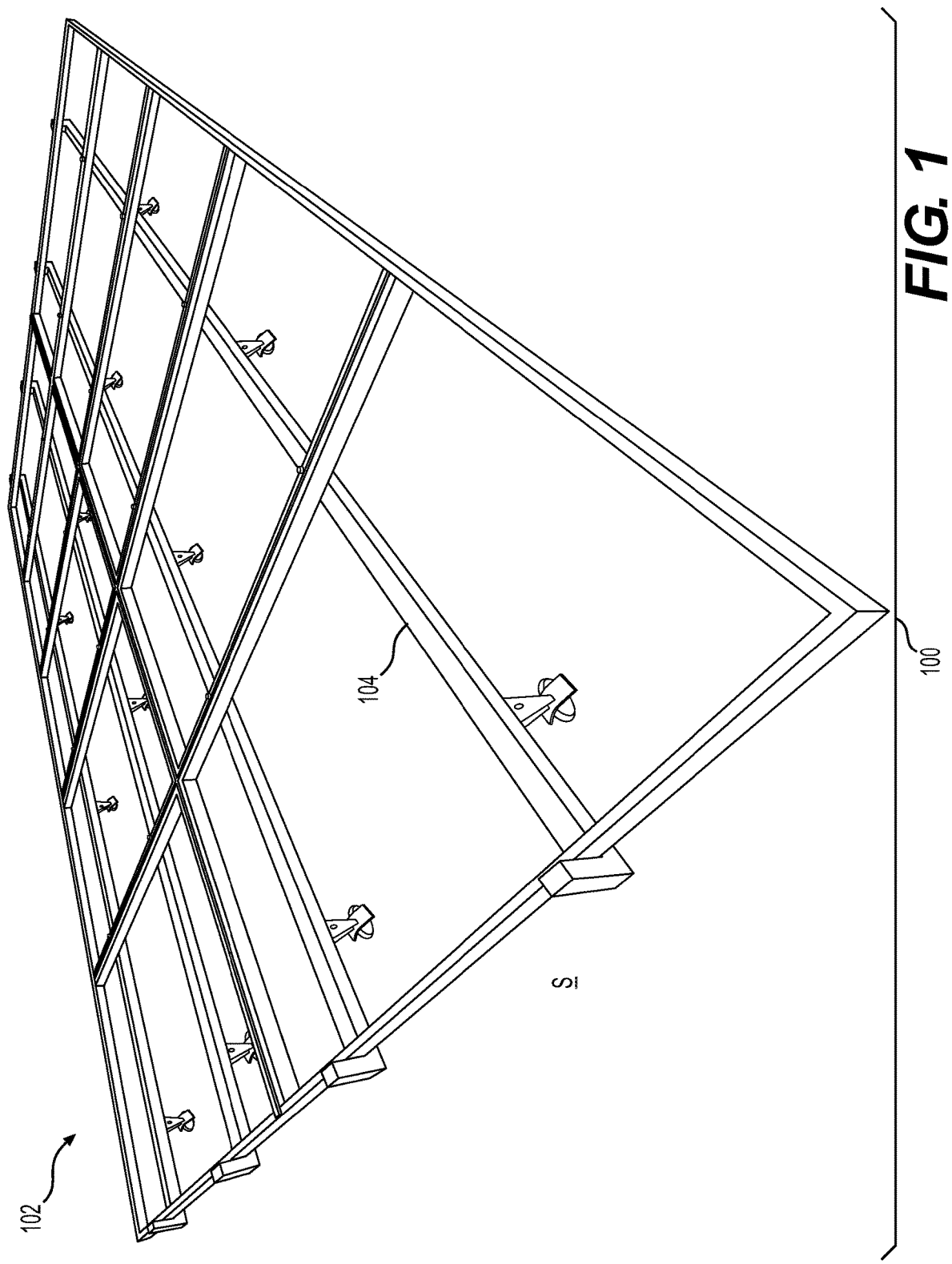
FIG. 1 illustrates a top perspective view of an exemplary solar panel mounting system including rails attached to brackets to secure solar panel modules to a roof or other surface, according to an embodiment in this disclosure.

FIG. 1 illustrates a top perspective view 100 of an embodiment of a solar panel mounting system 102 including a rail segment 104 (or "the rail segment 104"), which may include an elongated member having a channel therein that extends through all or a portion of the length of the rail segment 104. While FIG. 1 illustrates the mounting system 102 including one rail segment 104, the mounting system 102 may include a plurality of rail segments 104. For example, a plurality of rail segments 104 may be disposed underneath rows of modules for the length of the array of modules. For the purposes of this application, a rail segment 104 may be referred to as one of many contemplated possibilities of an "intermediary member" in that, in this instance, the expected use of the components of the mounting system 102 is to support solar panel modules upon a structure to prevent the modules from being directly against the mounting surface. Hence, the term "intermediary member" may be used whether a "rail segment" is used or if instead a substitute structure becomes the structure between (i.e., intermediate to) the mounted object (e.g., the solar panel module or other desired apparatus, device, etc.) and the roof or surface. In other words, while in the solar panel industry, the mounting system 102 is used for mounting solar panel modules on a rail segment structure, it is contemplated that there may be additional uses for one or more of the components of the disclosed mounting system 102 or the system in its entirety. For example, minor adaptations may potentially be needed to serve other industries more effectively. Regardless of use, any use of the components as may be claimed based on the disclosure herein is considered proprietary to the applicant and within the scope of the disclosure.

Returning to the mounting system 102, the rail segment 104 may be attached to a bracket that is in turn attached to a roof. The rail segment 104 may be an extrusion. For example, the rail segment 104 may be a metal extrusion, such as an aluminum extrusion, although other suitable materials for manufacture may be considered according to desired performance and function. Notably, the term "rail" as used herein may refer either to a full length rail member according to various standards in the industry for rails, or to shorter segments less than a standard sized rail, such as those depicted in a figure in some instances. However, for the sake of this application, reference to a rail or rail segment is to be understood to include a full standard length rail or a shorter than full length portion of a rail, inasmuch as the term segment is relative to different manufacturing standards anyway.

The mounting system 102 may mount solar panel modules ("modules") (not shown) to a roof or other surfaces (S), structures, machines, etc. For example, the mounting system 102 may be used to mount modules to walls, to the ground, to poles, to bridges, to vehicles, etc. The sizes of the modules may vary. That is, the various distinct manufacturers of modules have not standardized the sizes of the modules available in the industry, and thus the size of each module may vary based on the manufacturer producing the module. For example, one manufacturer may produce a module having a thickness (e.g., height) of about 32 millimeters (mm), while another manufacturer may produce another different module having a thickness of about 40 mm. As such, the mounting system 102 may include a clamp assembly (not shown in FIG. 1, but discussed in more detail below) that attaches to the rail segment 104 and electrically bonds with any one of the modules having a different thickness. For example, the clamp assembly may attach to the rail segment 104 and electrically bond to a module having a thickness of about 32 mm. In another example, the clamp assembly may attach to the rail segment 104 and electrically bond to another different module having a thickness of about 40 mm. The mounting system 102 as described herein facilitates a user (e.g., an installer, a technician, etc.) to quickly and easily install modules having varying thicknesses on surfaces such as the ground or a roof, structures, machines, etc. as desired. The clamp assembly may provide for fitting modules having a size of at least about 32 mm to about 40 mm. Although, the range of thicknesses as aforementioned is not to be understood as a limit on the capability of the instant disclosure to accommodate sizes outside of that range.

Figure 2:
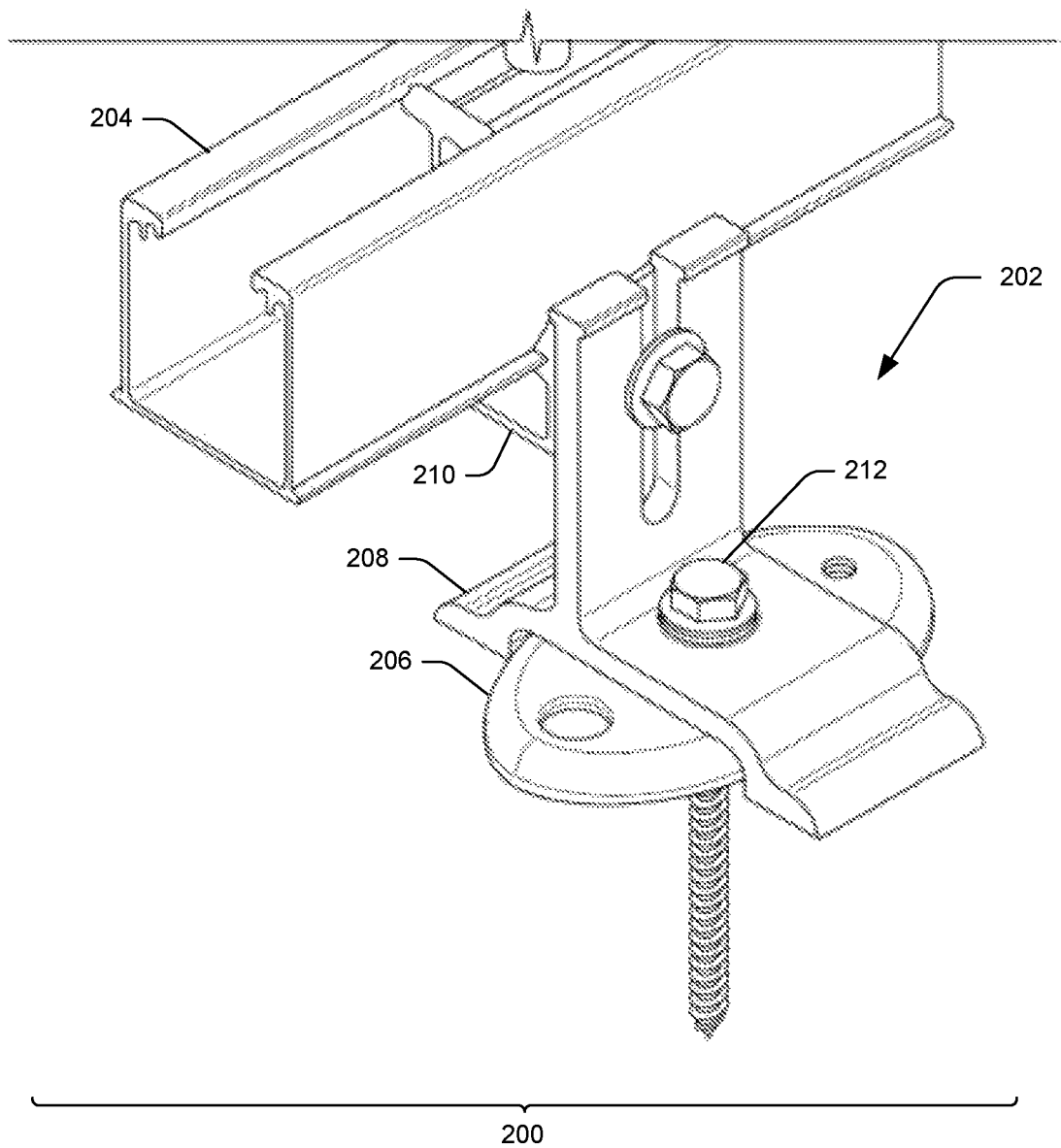
FIG. 2 illustrates a top perspective view of portions of an exemplary mounting system, according to an embodiment in this disclosure, for mounting a solar panel module to a roof or other surface.

FIG. 2 illustrates a top perspective view 200 of an exemplary mounting system 202 for mounting a module (not shown in FIG. 2) on a rail segment 204. The mounting system 202 includes a base 206 configured to be attached to a mounting surface (such as surface S in FIG. 1) and a mounting bracket 208 disposed vertically above the base 206. In an embodiment, the base 206 may be formed of plastic. In an embodiment, the mounting bracket 208 may be in positioned in direct contact with a top surface of the base 206. In an embodiment, the mounting system 202 may further include a clamp 210. It is contemplated that in other embodiments, the clamp 210 may have a different structure than that of the depicted clamp 210. A fastener 212 may secure the base 206 and the mounting bracket 208 against a mounting surface (not shown in FIG. 2), such as a roof, such that the fastener 212 is disposed through the base 206 and the mounting bracket 208 into the roof support structure (not shown).

Figure 3:
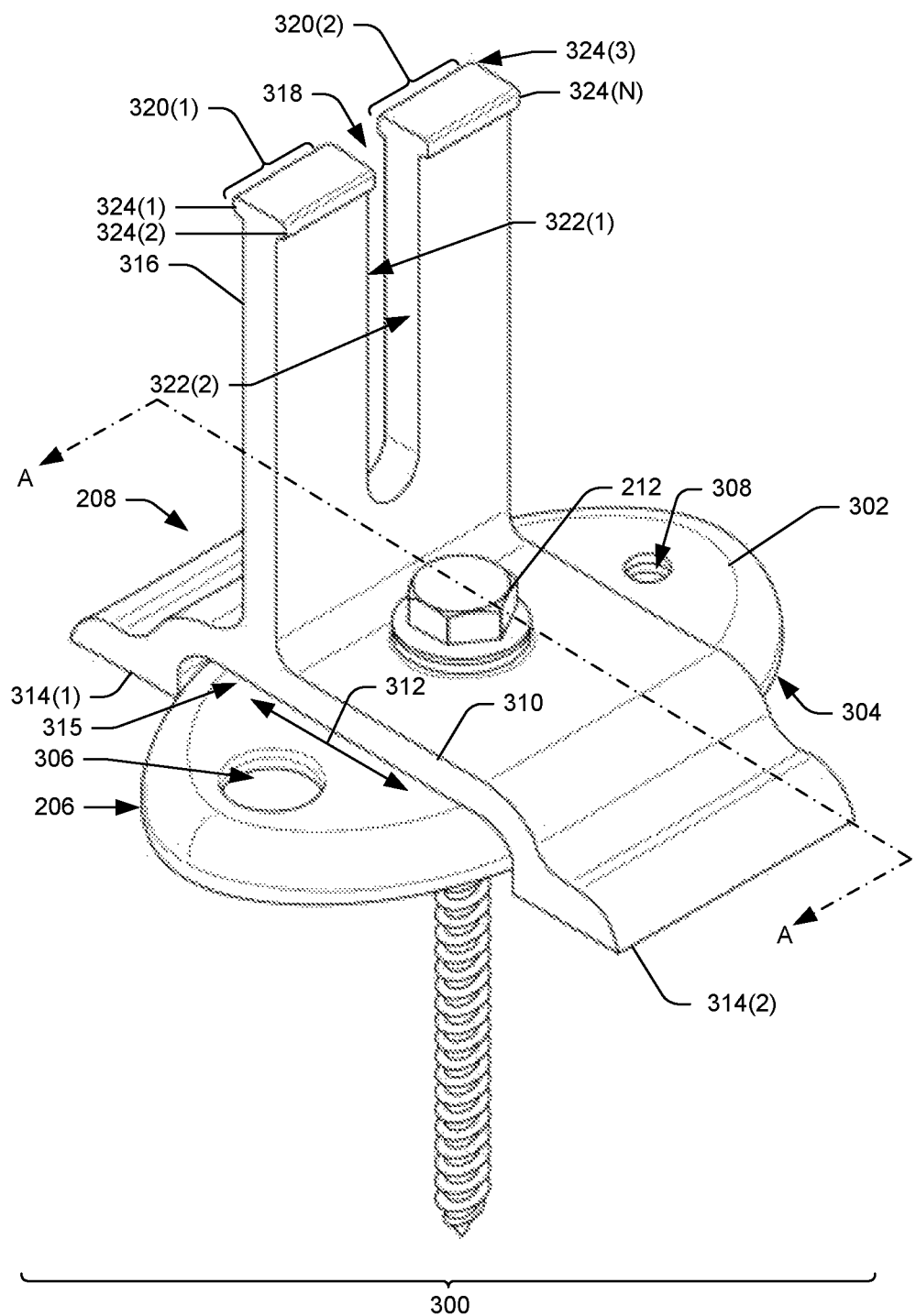
FIG. 3 illustrates a top perspective view of an exemplary base and a mounting bracket assembly of the mounting system of FIG. 2, according to an embodiment in this disclosure.

FIG. 3 illustrates a top perspective view 300 of the base 206 and the mounting bracket 208. The base 206 is shown having a top portion 302 (or a top surface) opposite a bottom portion 304 (or a bottom surface). The base 206 may include a cavity (shown in FIG. 4) that is open at the bottom portion 304 of the base 206. For example, the cavity is formed within the base extending from the bottom portion 304 of the base 206 towards the top portion 302. The base 206 may include a port 306 extending from the top portion 302 of the base 206 into the cavity within the base 206. The base 206 may also include a vent 308 disposed in the top portion 302 of the base 206 that extends into the cavity. The port 306 is configured to receive an injected sealant to fill the cavity with the injected sealant, thereby sealing around a penetration in the mounting surface created by the fastener 212. The injected sealant forces air from inside the cavity out of the vent 308 to ensure the injected sealant completely fills the cavity.

FIG. 3 illustrates the mounting bracket 208 mounts over a portion of the base 206 so as to mount over the top portion 302 of the base 206. The mounting bracket 208 may include a footing portion 310. The footing portion 310 may be shaped to straddle across a width direction 312 of the base 206 directly such that a first foot 314(1) and a second foot 314(2) contact a mounting surface on opposing sides of the base 206 respectively. The footing portion 310 may be shaped to straddle across the base 206 directly on the top portion 302 of the base 206. In other words, a bottom surface of the footing portion 310 may abut or engage a top surface of the top portion 302 (or more generally, the top portion 302). In such instances, the footing portion 310 may be offset from the first foot 314(1) and the second foot 314(2) to provide a region occupied by the base 206 (e.g., a channel, cavity, groove, etc.). For example, a channel 315 may be formed between the first foot 314(1) and the second foot 314(2) to accommodate being mounted over the base 206. Thus, the footing portion 310 is shaped to straddle across the base 206 directly on the top portion 302 of the base 206, at a location between the port 306 of the base 206 and the vent 308 of the base 206. For example, the channel 315, that extends a width of the footing portion 310, may be positioned upon implementation to align the footing portion 310 between the port 306 and the vent 308.

The mounting bracket 208 may include a stanchion 316 protruding from the footing portion 310 for slidably receiving the clamp 210. In an embodiment, the stanchion 316 protrudes transversely to the footing portion 310 (or a plane aligned therewith). In an embodiment, the stanchion 316 may include a slot 318 to receive a fastener (e.g., fastener 604 shown in FIG. 6) of the clamp 210 and the clamp 210 may be secured at a desired location within the slot 318. As discussed in detail herein below, the clamp 210 provides for securing the rail segment 204 to the mounting bracket 208.

In an embodiment, the stanchion 316 may further include a first vertical arm 320(1) opposite a second vertical arm 320(2). The first vertical arm 320(1) and the second vertical arm 320(2) may each have respective smooth and planar inside surfaces 322(1) and 322(2) facing each other. The smooth and planar inside surfaces 322(1) and 322(2) facing each other may define the slot 318. The stanchion 316 may include one or more top flanges 324(1), 324(2), 324(3), and 324(n). The one or more top flanges 324(1)-324(n) may provide for preventing the clamp 210 from being easily, unintentionally displaced. For example, if the clamp 210 was loosened due to warping or other unintended means, the one or more top flanges 324(1)-324(n) may prevent a vertical wall of the clamp 210 from sliding toward beyond the one or more top flanges 324(1)-324(n) at the top of the stanchion 316.

Figure 4:
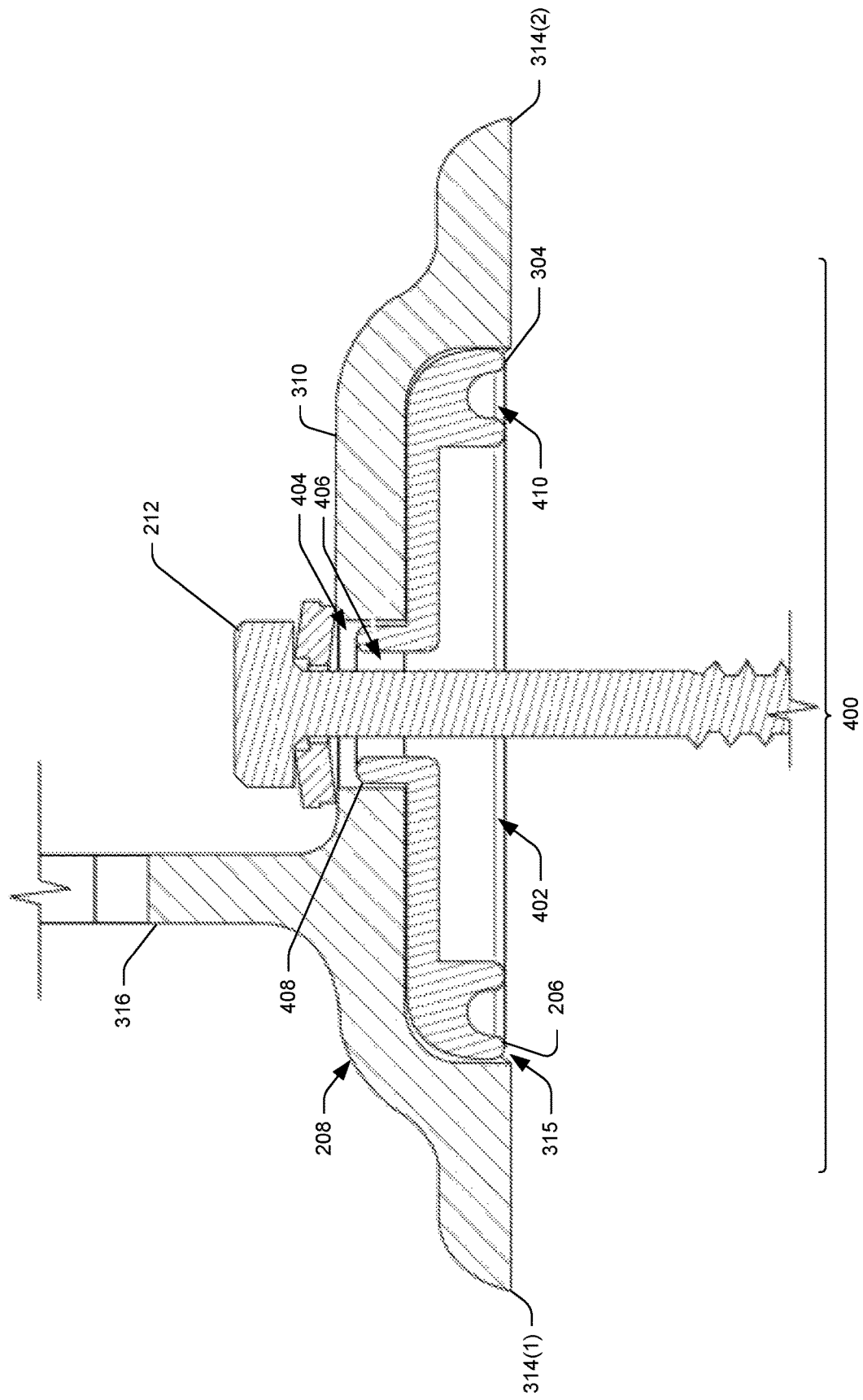
FIG. 4 illustrates a cross-sectional side view of a portion of the base and the mounting bracket assembly of FIG. 3, according to an embodiment in this disclosure.

FIG. 4 illustrates a cross-sectional side view 400 of the base 206 and a portion of the mounting bracket 208 of FIG. 3, taken though line A-A of FIG. 3. FIG. 4 illustrates the base 206 may include a cavity 402 that is open at the bottom portion 304 of the base 206. As noted above, the cavity 402 may be filled (e.g., injected) with a sealant via the port 306.

FIG. 4 further illustrates a through-hole 404 disposed through the footing portion 310 of the mounting bracket 208. The through-hole 404 may be disposed through the footing portion 310 adjacent to the stanchion 316. The through-hole 404 aligns (e.g., is concentric) with an opening 406 of the base 206. The through-hole 404 and the opening 406 accommodate the fastener 212 therein to secure the base 206 and the mounting bracket 208 against the mounting surface.

As also shown, the base 206 may include a collar 408 that is at least partially received within the through-hole 404. For example, the collar 408 surrounds the opening 406 and may extend at least partially into the through-hole 404 for situating, positioning, or otherwise locating the mounting bracket 208 on the base 206, vice versa. In doing so, a portion of the base 206 is shown residing at least partially within the channel 315, between the first foot 314(1) and the second foot 314(2), upon installation. In an embodiment, the base 206 may further include a groove 410 that surrounds a surface-facing perimeter of the cavity 402. The groove 410 may be configured to secure a seal (e.g., an O-ring, a gasket, flexible flanges, etc.) therein. The seal provides the base with a surface-shape conforming interface with the surface on which the base 206 may be implemented, thereby providing an effective seal against intrusion of moisture.

Figure 5:
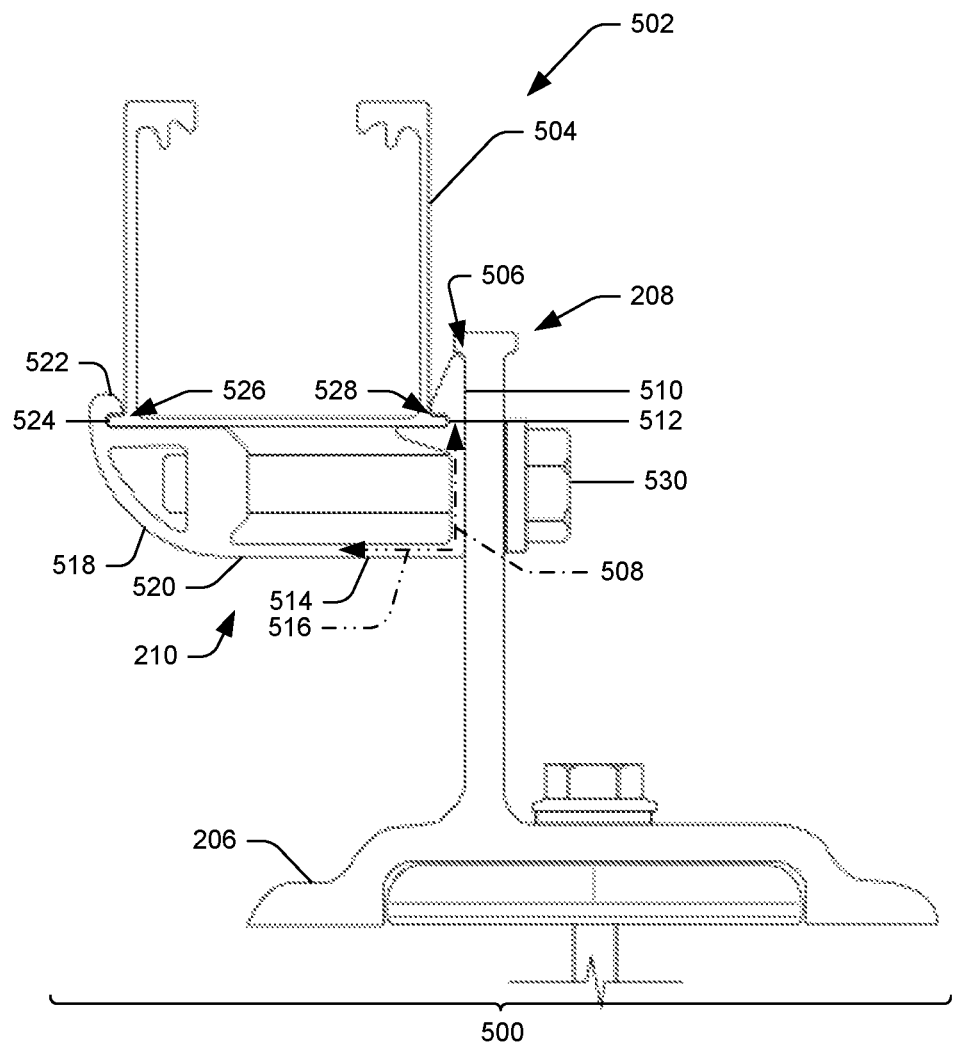
FIG. 5 illustrates a side view of various components of the exemplary mounting system of FIG. 2, according to an embodiment in this disclosure.

FIG. 5 illustrates a side view 500 of an exemplary mounting system 502. The mounting system 502 is similar to the mounting system 202 in FIG. 2. Inasmuch as other components of the mounting system 502 are similar to those of mounting system 202, the reference numbers remain the same on the same parts for convenience.

FIG. 5 illustrates the mounting system 502 including the clamp 210 securing a rail segment 504 to a mounting bracket 208. The clamp 210 may include a vertical wall 506 that extends in a first direction 508 having a planar surface 510 that abuts or is positioned adjacent to the stanchion 316. The clamp 210 may include a first groove 512 disposed in the vertical wall 506 opposite the planar surface 510. The clamp 210 may also include a horizontal flange 514 protruding from the vertical wall 506 in a second direction 516 that is transverse to the first direction 508. A web section 518 may extend off of an end 520 of the horizontal flange 514. The web section 518 may be an angled web section extending off of the end 520 of the horizontal flange 514. A lip 522 may extend vertically from the web section 518. A second groove 524 may be disposed in the lip 522.

When the clamp 210 receives the rail segment 504 to secure the rail segment 504 to the mounting bracket 208, at least a first protrusion 526 of the rail segment 504 is received by the second groove 524 and the horizontal flange 514 is urged to flex and to displace the second groove 524 disposed in the lip 522 a distance such that at least a second protrusion 528 of the rail segment 504 is received by the first groove in the vertical wall 506. For example, during coupling of the rail segment 504, the horizontal flange 514 may flex in the second direction 516, and/or a third direction that is opposite the first direction 508, to enable the first protrusion 526 to engage with the second groove 524 and the second protrusion 528 to engage the first groove 512. Furthermore, the clamp 210 may include a fastener 530 for securing the rail segment 504 in place to the clamp 210. That is, the clamp 210 may secure the lower side of the rail segment 504 by holding the first and second protrusions 526 and 528, respectively in first and second grooves 512 and 524.

Figure 6:
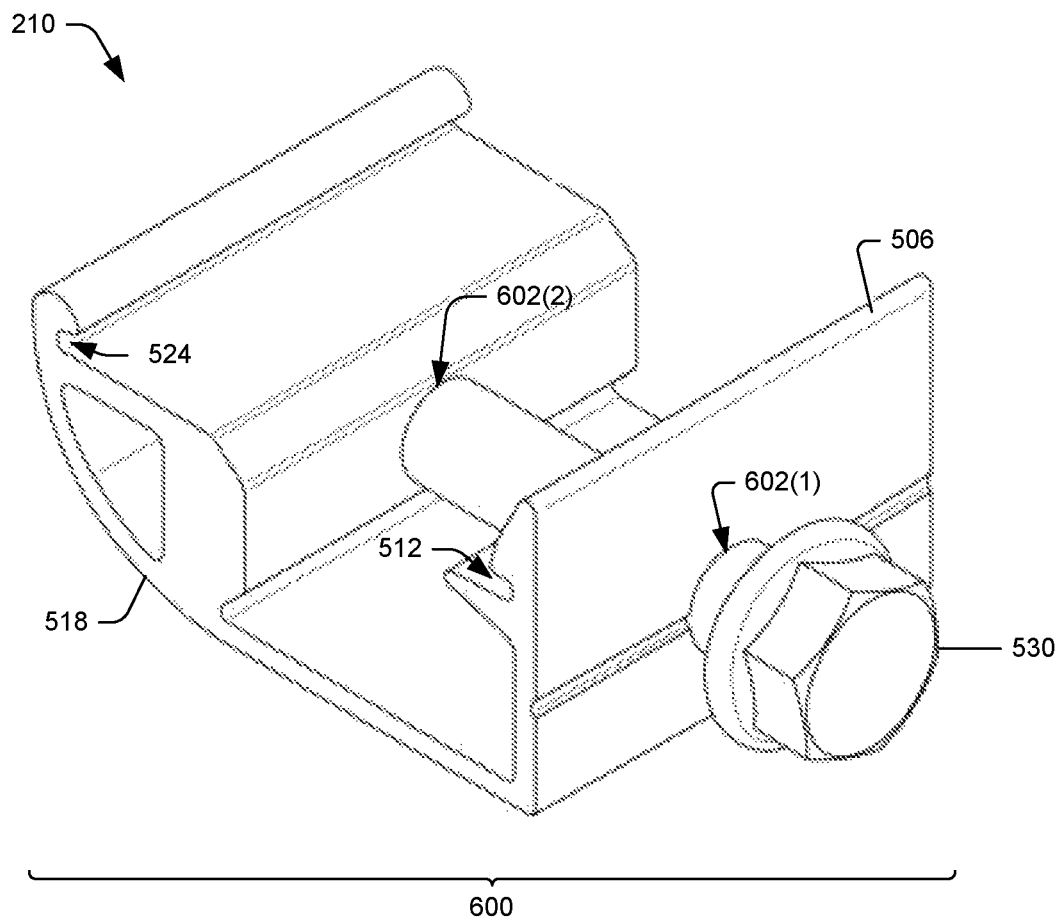
FIG. 6 illustrates a top perspective view of a clamp of the mounting system of FIG. 2, according to an embodiment in this disclosure.

FIG. 6 illustrates a top perspective view 600 of the clamp 210. FIG. 6 illustrates that the clamp 210 may include a first through-hole 602(1) defined horizontally through the vertical wall 506 and a second through-hole 602(2) that extends at least partially through the web section 518. The through-holes 602(1) and 602(2) accommodate the fastener 530 therein. The fastener 530 is positioned to pull the web section 518 toward the vertical wall 506, thereby clamping the rail segment 504 to the clamp 210. In one example, the through-hole 602(2) may be threaded. In another example, the through-hole 602(2) may not be threaded, rather there may be a nut on the backside of the through-hole 602(2) that threadably couples with the fastener 530. The clamp 210 also provides for electrically bonding one module to another module and/or electrically bonding one or more modules to a rail segment.

Figure 7:
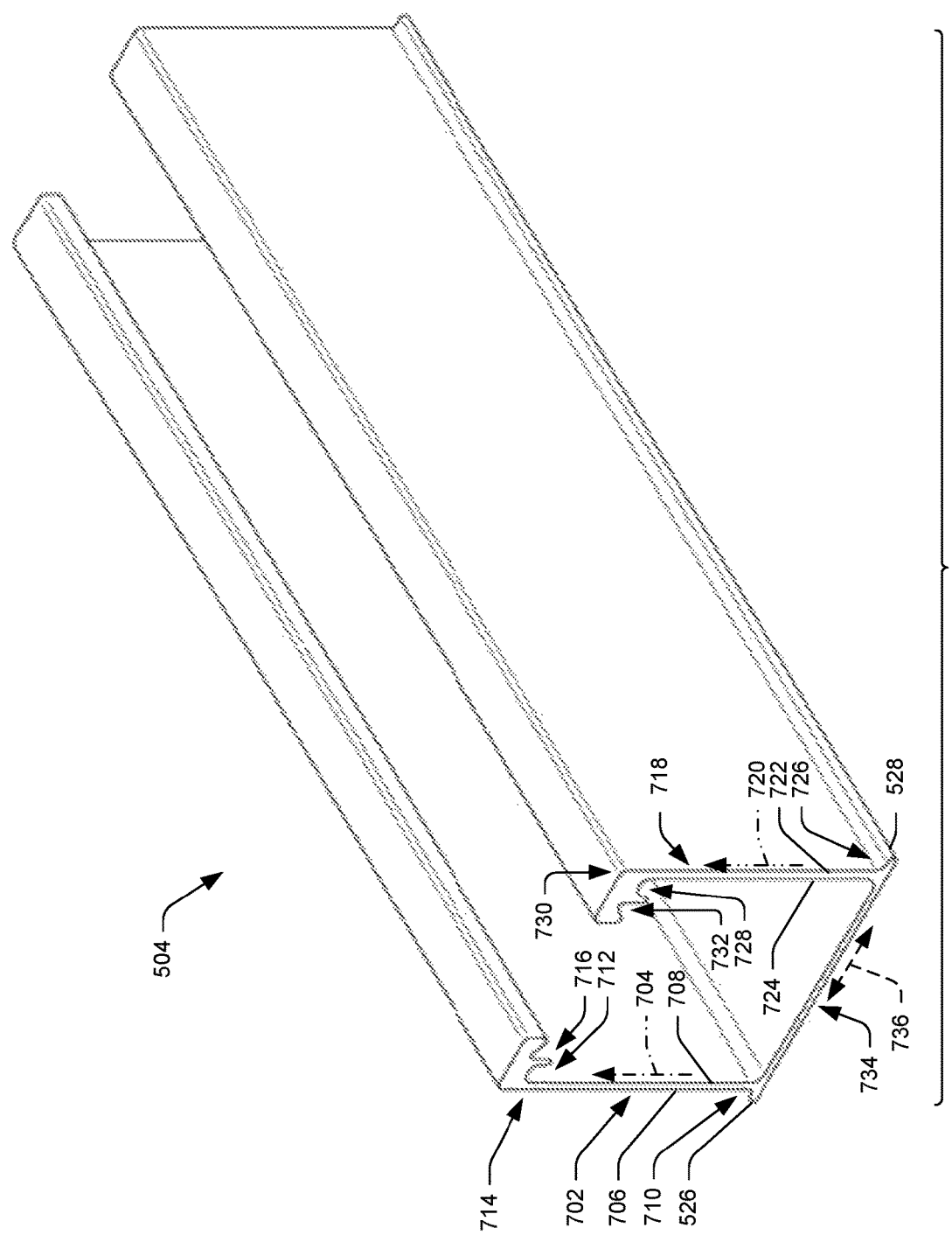
FIG. 7 illustrates a top perspective view of a rail segment of the mounting system of FIG. 2, according to an embodiment in this disclosure.

FIG. 7 illustrates a top perspective view 700 of the rail segment 504 illustrated in FIG. 5. As depicted, the rail segment 504 is shaped to attach to the clamp 210. The rail segment 504 includes a first vertical wall 702 that extends in a first direction 704. The first vertical wall 702 has an outside surface 706 opposite an inside surface 708. The first vertical wall 702 includes the first protrusion 526 protruding from the outside surface 706 at a bottom portion 710 of the first vertical wall 702 thereof. As discussed above with regard to FIG. 5, the first protrusion 526 is correspondingly shaped to be received by the second groove 524 of the clamp 210.

The first vertical wall 702 may also include a first inner groove 712 that extends longitudinally along a length of the rail segment 504 and is disposed at a top end 714 of the inside surface 708 of the first vertical wall 702. The first inner groove 712 may be configured to receive a top portion of a first vertical wall of a splice rail (not shown in FIG. 7). Additionally, the first vertical wall 702 may include a second inner groove 716 that extends longitudinally along the length of the rail segment 504 and is adjacent and parallel to the first inner groove 712, and thus also is disposed at the top end 714 of the inside surface 708 of the first vertical wall 702. The second inner groove 716 may be configured to receive a first cooperating portion of a rail nut (not shown in FIG. 7). As shown, the first inner groove 712 may be located more proximate to the inside surface 708 as compared to the second inner groove 716.

As depicted, the rail segment 504 includes a second vertical wall 718 that stands opposite from and, extends in a second direction 720 parallel to, the first direction 704 of the first vertical wall 702. The second vertical wall 718 has an outside surface 722 opposite an inside surface 724. The second vertical wall 718 may include the second protrusion 528 protruding from the outside surface 722 of the second vertical wall 718 at a bottom portion 726 thereof. As discussed above with regard to FIG. 5, the second protrusion 528 is correspondingly shaped to be received by the first groove 512 of the clamp 210.

The second vertical wall 718 may include a third inner groove 728 that extends longitudinally along a length of the rail segment 504 and is disposed at a top end 730 of the inside surface 724 of the second vertical wall 718. The third inner groove 728 may be mirror-symmetric of the first inner groove 712 and may be configured to receive a top portion of a second vertical wall of the splice rail (not shown in FIG. 7). Like the first vertical wall 702, the second vertical wall 718 may include another mirror-symmetrical groove with respect to the second inner groove 716, i.e., a fourth inner groove 732, that extends longitudinally along the length of the rail segment 504 and is adjacent and parallel to the third inner groove 728, and thus also is disposed at the top end 730 of the inside surface 724 of the second vertical wall 718. The fourth inner groove 732 may be configured to receive a second cooperating portion of a rail nut (not shown in FIG. 7). As shown, the third inner groove 728 may be located more proximate to the inside surface 724 as compared to the fourth inner groove 716.

The rail segment 504 further includes a horizontal base 734 extending in a direction 736 transverse to the first direction 704 of the first vertical wall 702 and the second direction 720 of the second vertical wall 718. The horizontal base 734 thus connects and is integrally formed with the bottom portion 710 of the first vertical wall 702 and the bottom portion 726 of the second vertical wall 718.

Figure 8:
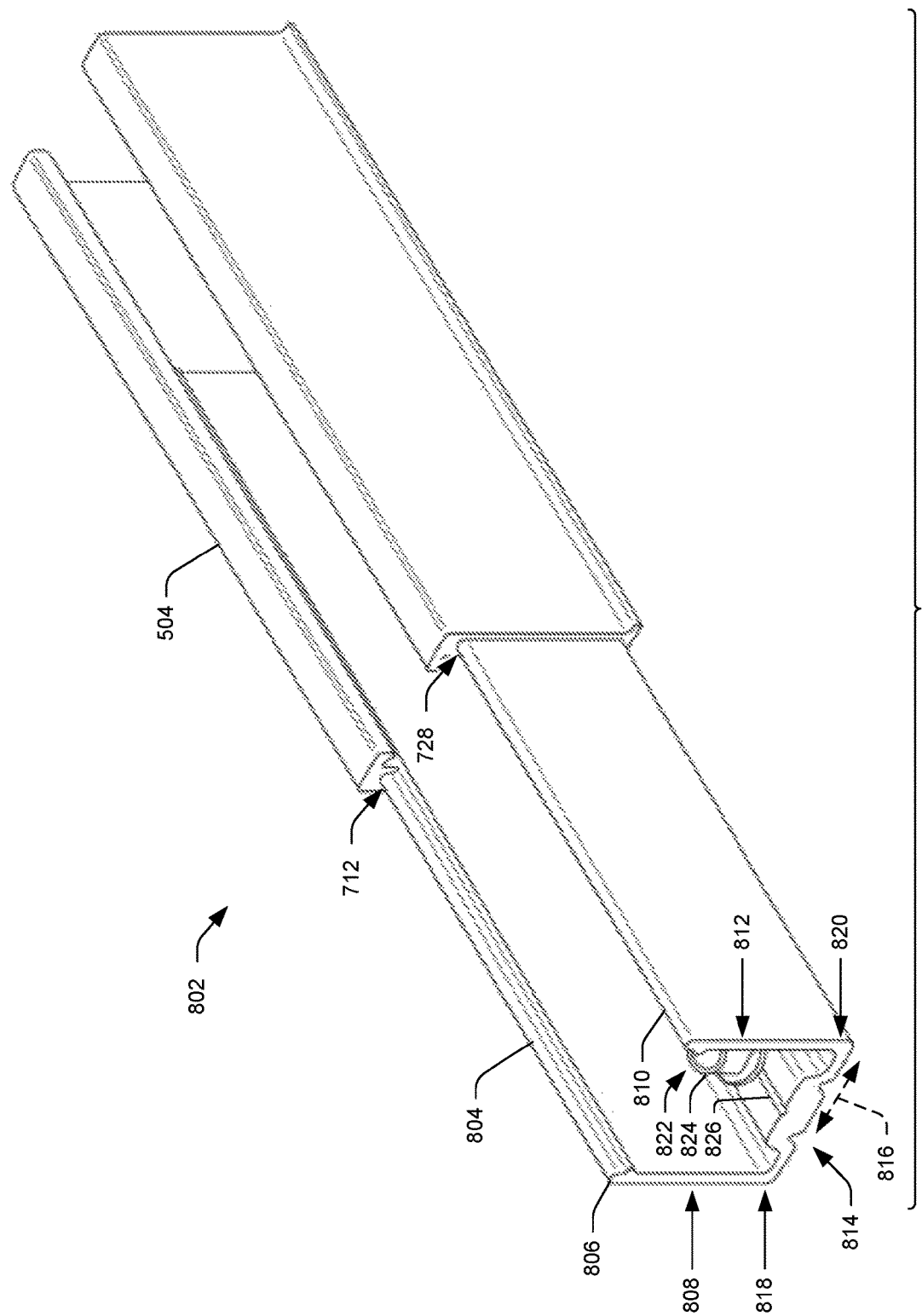
FIG. 8 illustrates a top perspective view of a splice assembled within the rail segment of FIG. 7, according to an embodiment in this disclosure.

FIG. 8 illustrates a top perspective view 800 of a rail splice assembly 802. The rail splice assembly 802 may include the rail segment 504 and a splice rail 804 that is at least partially received by the rail segment 504. The splice rail 804 is configured to extend a running length of a line of consecutive rails by connecting, for example, the rail segment 504 to a second rail segment (not shown in FIG. 8).

Accordingly, the splice rail 804 may include a top portion 806 of a first vertical wall 808 and a top portion 810 of a second vertical wall 812. The top portion 806 of the first vertical wall 808 may be a first cooperating portion (e.g., first projection) configured and shaped to be received by the first inner groove 712 disposed at the top end of the inside surface 708 of the first vertical wall 702 of the rail segment 504. The top portion 810 of the second vertical wall 812 may be a second cooperating portion (e.g., second projection) configured and shaped to be received by the third inner groove 728 disposed at the top end of the inside surface 724 of the second vertical wall 718 of the rail segment 504. The top portions 806 and 810 of the first and second vertical walls 808 and 812 of the splice rail 804 may be slidably received by the first and third inner grooves 712 and 728 of the rail segment 504 such that the splice rail 804 and/or the rail segment 504 may be secured at a desired location relative to each other.

The splice rail 804 further includes a horizontal base 814 extending generally in a direction 816 transverse to the first vertical wall 808 of the splice rail 804 and the second vertical wall 812 of the splice rail 804. The horizontal base 814 thus connects and is integrally formed with a bottom portion 818 of the first vertical wall 808 of the splice rail 804 and a bottom portion 820 the second vertical wall 812 of the splice rail 804. A fastener 822 may be disposed in the horizontal base 814 such that a head 824 of the fastener 822 is disposed between the first vertical wall 808 of the splice rail 804 and the second vertical wall 812 of the splice rail 804 and disposed on top of a surface 826 of the horizontal base 814. The fastener 822 may be used to lock the splice rail 804 to the rail segment 504 and/or a second rail segment. For example, when the fastener 822 is tightened, a portion (e.g., an end) of the fastener 822 may be driven into an upper surface of the horizontal base 734 of a rail segment to compress the top portions 806 and 810 of the first and second vertical walls 808 and 812 of the splice rail 804 into the first and third inner grooves 712 and 728 of a rail segment. In another example, when the fastener 822 is tightened, a nut attached to the fastener underneath the splice rail 804 may clamp the splice rail 804 together with a rail segment. The fastener 822, in combination with the splice lock of the first rail segment 504 to the second rail segment via the splice rail 804, structurally and electrically connects the first rail segment 504 to the second rail segment. The fastener 822 provides for electrical bonding of the first rail segment 504 to the adjacent running rail segment. For example, the fastener 822 may include one or more protrusions (e.g., serrations, teeth, etc.) arranged on the underside of the head of fastener 822 that penetrate anodization on rails, thus bonding rails together.

Figure 9:
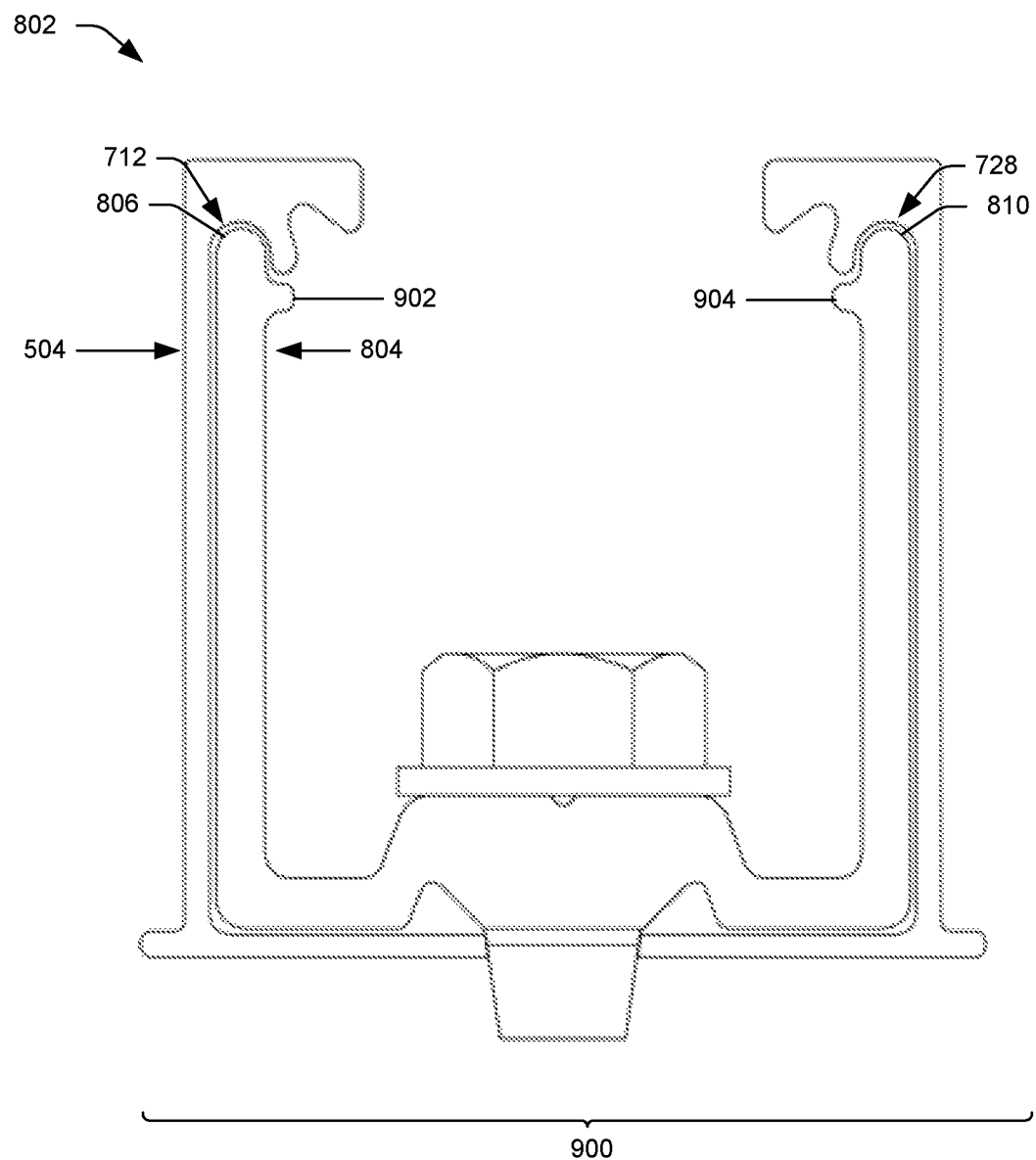
FIG. 9 illustrates an end view of the splice within the rail segment of FIG. 8, according to an embodiment in this disclosure.

FIG. 9 illustrates an end view 900 of the rail splice assembly of FIG. 8. FIG. 9 illustrates the first inner groove 712 of the rail segment 504 being configured to receive the top portion 806 of the splice rail 804 and the third inner groove 728 of the rail segment 504 being configured to receive the top portion 810 of the splice rail 804. For example, the first and third inner grooves 712 and 728 of the rail segment 504 may slidably receive the top portions 806 and 810 of the splice rail 804.

FIG. 9 illustrates an embodiment in which the top portions 806 and 810 of the splice rail 804 have a protruding curvilinear shape configured to be slidably received by the first and third inner grooves 712 and 728 of the rail segment 504. The first and third inner grooves 712 and 728 of the rail segment 504 may thus have correspondingly curvilinear-shaped groove (e.g., channel), configured to slidably receive the protruding respective curvilinear-shaped top portions 806 and 810 of the splice rail 804. The top portion 806 may include a protrusion 902 and the top portion 810 may include a protrusion 904. The protrusions 902 and 904 may assist in the alignment of splice rail 804 with the first and third inner grooves 712 and 728 of the rail segment 504. It is contemplated as within the scope of the disclosure, that while FIG. 9 illustrates the rail segment 504 including curvilinear-shaped grooves configured to be slidably received by the protruding curvilinear shaped top portions 806 and 810 of the splice rail 804, the aforementioned arrangement of the correspondingly shaped parts of the rail and the splice rail could easily be alternatively placed, such that, in an embodiment considered but not depicted for the sake of convenience, the rail segment 504 may include the protrusions that are correspondingly shaped to be slidably received by grooves of the splice rail 804.

Accordingly, the splice rail 804 may be used for connecting two rail segments while maintaining the strength of a continuous rail. It is contemplated that the open U-shape of the splice rail 804 and the fastener 822 being oriented downward at the bottom of the splice rail 804 may assist in wire management and may prevent interference with module clamps and roof attachments. Moreover, the top portions 806 and 810 and/or the protrusions 902 and 904 interface with the first and third inner grooves 712 and 728 of the rail segment 504 to provide a structural connection in multiple axes and may prevent a pop-out condition in down-slope loading.

Figure 10:
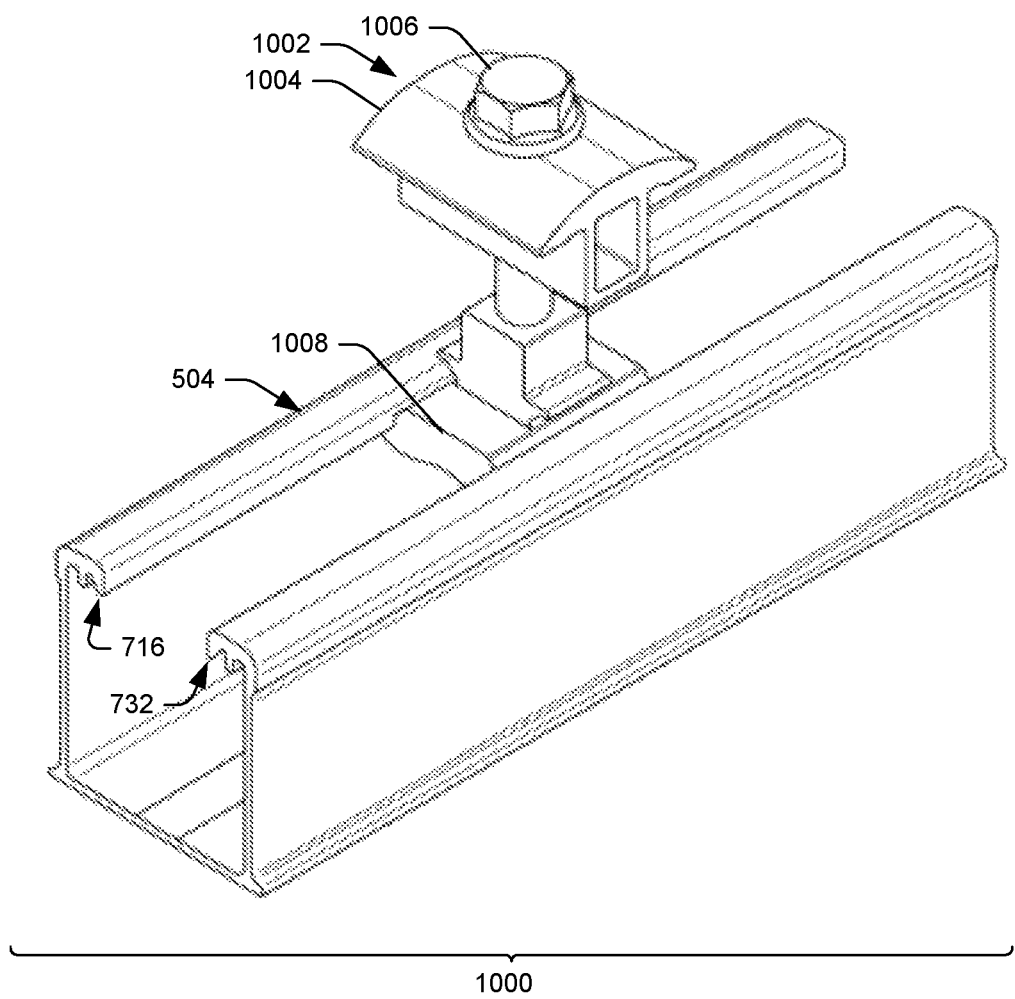
FIG. 10 illustrates a top perspective view of a clamp assembly connected to the rail segment of FIG. 7, according to an embodiment in this disclosure, for clamping a solar panel module to the rail segment.

FIG. 10 illustrates a top perspective view 1000 of a clamp assembly 1002 for mounting a module (not shown in FIG. 10) on the rail segment 504. The clamp assembly 1002 may include a bonding clamp 1004, a fastener 1006, and a connection member 1008 (e.g., a rail nut). The components of the clamp assembly 1002 are configured such that when implemented, by tightening the fastener 1006, the bonding clamp 1004 is positioned to clamp against a module (module not shown in FIG. 10) and the connection member 1008 is positioned to clamp against the second inner groove 716 and the fourth inner groove 732 of the rail segment 504. The clamp assembly 1002 may substantially rely on the fastener 1006 to resist a rotation of the bonding clamp 1004 away from a module (not shown in FIG. 10) as the fastener 1006 is tightened. For example, the clamp assembly 1002 may rely solely on the fastener 1006, and not on another reinforcing structural member, to resist a rotation of the bonding clamp 1004 away from a module as the fastener 1006 is tightened.

Figure 11:
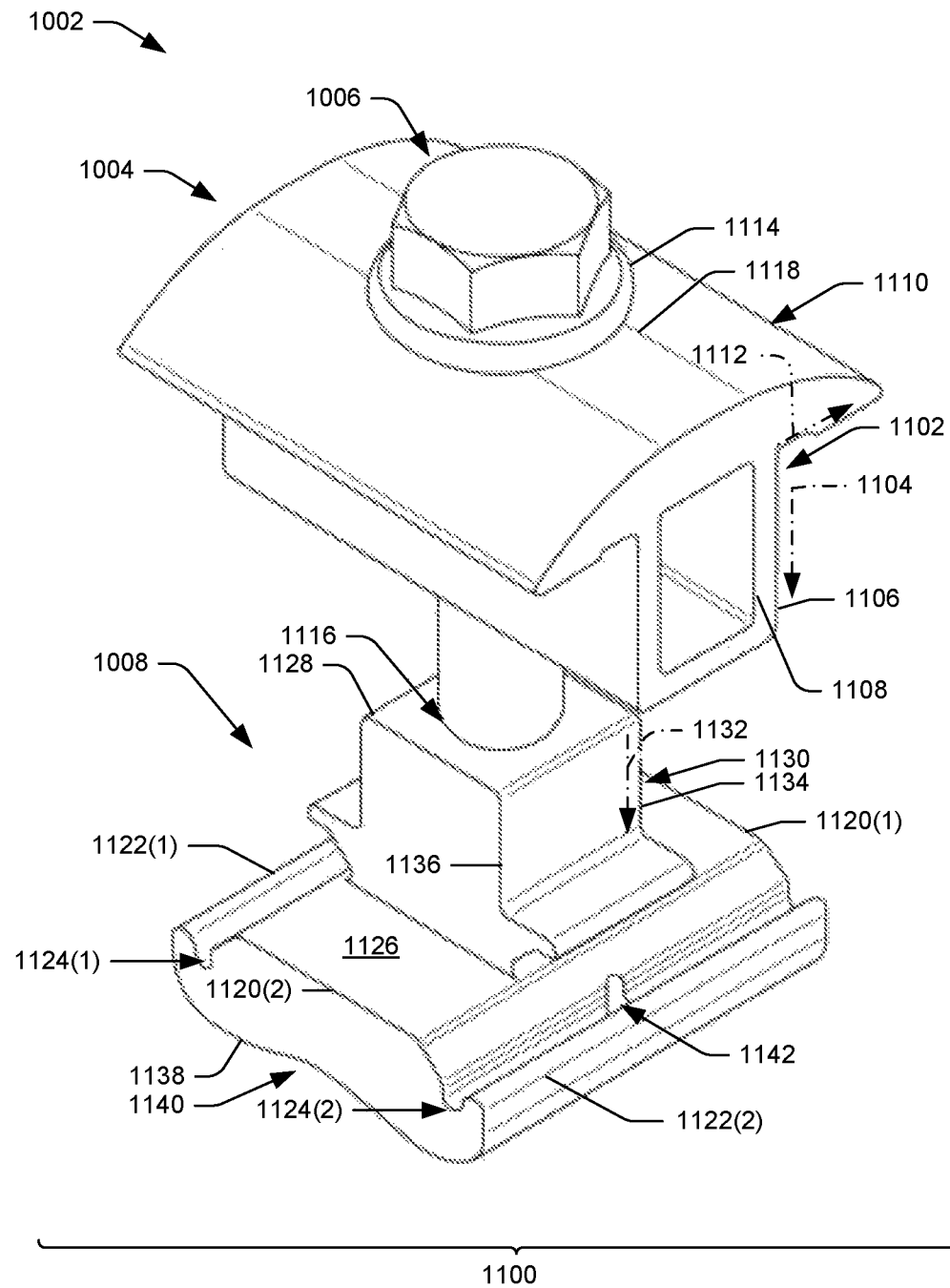
FIG. 11 illustrates a top perspective view of the clamp assembly of FIG. 10, according to an embodiment in this disclosure.

FIG. 11 illustrates a top perspective view 1100 of the clamp assembly 1002. The bonding clamp 1004 may include a lateral edge support portion 1102 that extends in a first direction 1104 to support against a lateral edge of the module. The lateral edge support portion 1102 has at least a first surface 1106 to face the module and a second surface 1108 opposite the first surface 1106. The lateral edge support portion 1102 may be a first lateral edge support portion to support against a first module and the bonding clamp 1004 may include a second lateral edge support portion opposite the first lateral edge support portion to support against a lateral edge of a second module.

The bonding clamp 1004 may include a flange 1110 that extends in a second direction 1112 transverse to the first direction 1104 to clamp against an upper surface of the module in coordination with the lateral edge support portion 1102. The flange 1110 may include one or more bonding protrusions (e.g., bonding pins, serrations, teeth, etc.) disposed on the underside surface of the flange 1110 for puncturing or compromising an anodized layer, a galvanized layer, a painted layer, etc. of a module to electrically bond with the module. The flange 1110 may extend on either side of the bonding clamp 1004, for example, to include two flanges 1110. The fastener 1006 has a first end 1114 opposite a second end 1116. The first end 1114 of the fastener 1006 is configured to interface with a top surface 1118 of the flange 1110. The connection member 1008 may be attached to the second end 1116 of the fastener 1006. Holes extend through the bonding clamp 1004 and the connection member 1008 for accommodating the fastener 1006 therethrough. In an embodiment, the connection member 1008 may include a threaded passage for fastening with the fastener 1006. In another embodiment, the connection member 1008 may include a threadless through-hole that is configured to receive the fastener 1006 so that a nut disposed on the underside of the connection member 1008 fastens to the fastener 1006.

FIG. 11 illustrates that the connection member 1008 includes a first end 1120(1) opposite a second end 1120(2). The connection member 1008 further includes a first side 1122(1) extending between the first end 1120(1) and the second end 1120(2). The first side 1122(1) includes a first groove 1124(1) to clamp into the second inner groove 716 of the rail segment 504. The connection member 1008 also includes a second side 1122(2) extending between the first end 1120(1) and the second end 1120(2). The second side 1122(2) includes a second groove 1124(2) to clamp into the fourth inner groove 732 of the rail segment 504. The first and second grooves 1124(1) and 1124(2) of the connection member 1008 may be slidably received by the second and fourth inner grooves 716 and 732, respectively, of the rail segment 504 such that the connection member 1008 may be secured at a desired location along the rail segment 504.

The connection member 1008 includes a top surface 1126 extending between the first end 1120(1) and the second end 1120(2). The connection member 1008 may include a boss 1128 that extends from the top surface 1126 in a position that is fixed in an orientation with respect to the first side 1122(1) and the second side 1122(2). In one example, the boss 1128 may be integrally formed with the connection member 1008. In another example, the boss 1128 may be a separate component and not integrally formed with the connection member 1008. The boss 1128 may have a lateral edge support portion 1130 that extends in a second direction 1132 parallel to the first direction 1104 of the lateral edge support portion 1102 of the bonding clamp 1004 to support against the lateral edge of the module. The lateral edge support portion 1130 of the boss 1128 further has at least a first surface 1134 to face the module and a second surface 1136 opposite the first surface 1134. The lateral edge support portion 1102 may be a first lateral edge support portion and the second surface 1136 may include a second lateral edge support portion to support against a lateral edge of a second module. In an embodiment, the boss 1128 is centered between the first end 1120(1) and the second end 1120(2). The boss 1128 may include one or more protrusions protruding from a bottom portion of the boss between the first surface 1134 and the second surface 1136 of the boss 1128. The one or more protrusions are configured to rest on the top portions of the first and second vertical walls 702 and 718 and prevent the connection member 1008 from falling into the rail segment between the first and second vertical walls 702 and 718 of the rail segment 504.

The connection member 1008 includes a bottom surface 1138 opposite the top surface 1126 and extending between the first end 1120(1) and the second end 1120(2). The bottom surface 1138 may be defined by a concave shape 1140 in a side profile thereof to provide for managing wire disposed in the rail segment 504. The connection member 1008 may electrically bond with the rail segment. The connection member 1008 may include one or more holes 1142 disposed in the first and second grooves 1124(1) and 1124(2) of the connection member 1008. The one or more holes 1142 disposed in the first and second grooves 1124(1) and 1124(2) of the connection member 1008 may receive bonding protrusions (e.g., bonding pins, serrations, teeth, etc.) disposed in the first and second grooves 1124(1) and 1124(2) for puncturing or compromising an anodized layer, a galvanized layer, a painted layer, etc. of a rail segment to electrically bond with the rail segment.

Figure 12:
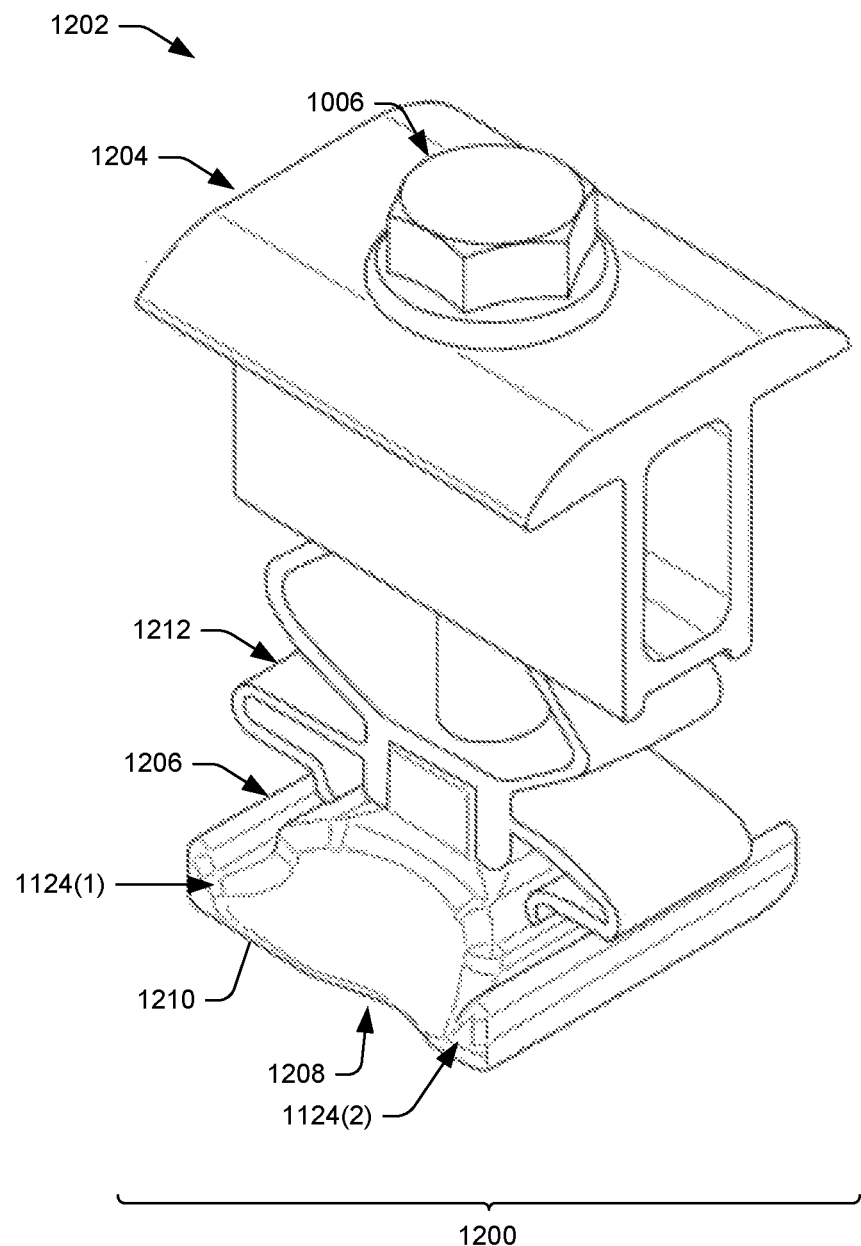
FIG. 12 illustrates a top perspective view another clamp assembly that may be connected to the rail segment of FIG. 7, according to another embodiment in this disclosure.

FIG. 12 illustrates a top perspective view 1200 of another clamp assembly 1202. The clamp assembly 1202 may include a bonding clamp 1204, the fastener 1006, and a connection member 1206. Similar to bonding clamp 1004, when implemented, the bonding clamp 1204 is configured to clamp against a module (not shown in FIG. 12) and may include one or more bonding protrusions (e.g., bonding pins, serrations, teeth, etc.) disposed on the underside surfaces of the flanges of the bonding clamp 1204 for puncturing or compromising an anodized layer, a galvanized layer, a painted layer, etc. of a module to electrically bond with the module. Here, in this embodiment, the connection member 1206 may include a bottom surface 1208 having a thin protruding wall 1210 to provide for managing a wire disposed in the rail segment 504. For example, the thin protruding wall 1210 may protect wires in the rail segment 504 from a clamp bolt (e.g., fastener 822). The clamp assembly 1202 includes a stabilizing component 1212 that holds the connection member 1206 up into position during installation of the clamp assembly 1202 with the rail segment 504. For example, the stabilizing component 1212 may provide a spring force that pulls the connection member 1206 up against the second and fourth inner grooves 716 732 of the rail segment 504. The stabilizing component 1212 may be configured to interface with the first and second vertical walls 702 and 718 and prevent the connection member 1206 from falling into the rail segment between the first and second vertical walls 702 and 718 of the rail segment 504.

Figure 13:
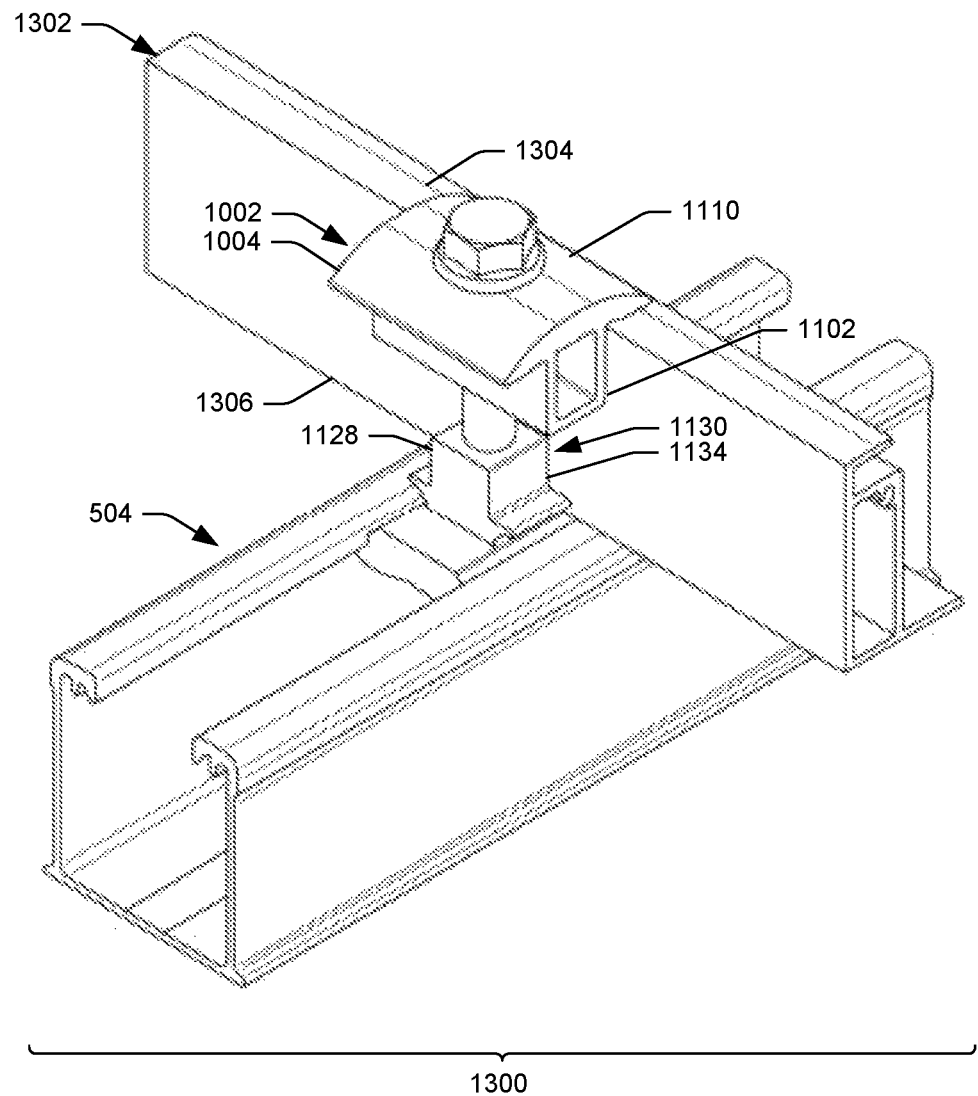
FIG. 13 illustrates a top perspective view of the clamp assembly of FIG. 11 connected to a rail segment of FIG. 7, and a portion of a solar panel module connected to the clamp assembly, according to an embodiment in this disclosure.

FIG. 13 illustrates a top perspective view 1300 of the clamp assembly 1002 mounting a portion of a solar panel module 1302 on the rail segment 504. FIG. 13 illustrates the flange 1110 of the bonding clamp 1004 clamped against an upper surface 1304 of the solar panel module 1302 in coordination with the lateral edge support portion 1102 clamped against a lateral edge portion 1306 of the solar panel module 1302. FIG. 13 illustrates the lateral edge support portion 1130 of the boss 1128 having the first surface 1134 facing and abutting the solar panel module 1302.

Figure 14:
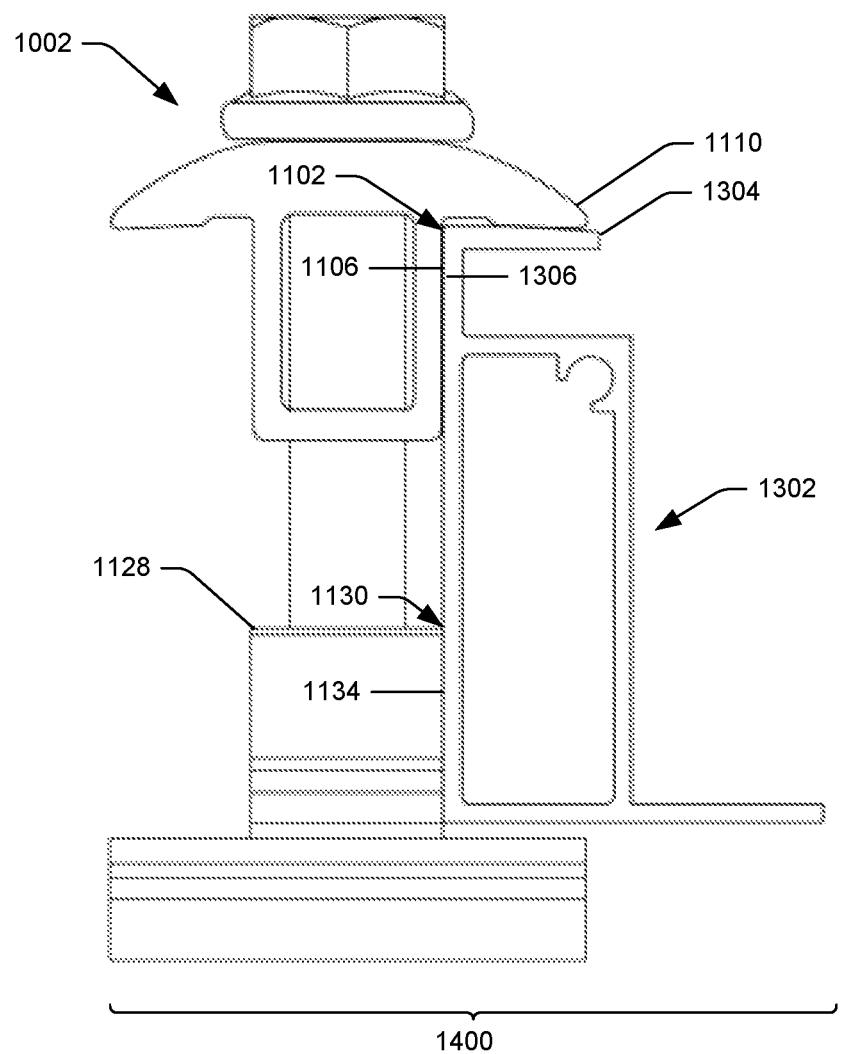
FIG. 14 illustrates a side view of the clamp assembly of FIG. 11 mounting the portion of the solar panel module of FIG. 13, according to an embodiment in this disclosure.

FIG. 14 illustrates a side view 1400 of the clamp assembly 1002 mounting the portion of the solar panel module 1302. FIG. 14 illustrates the lateral edge support portion 1102 having at least the first surface 1106 facing and/or aligning the solar panel module 1302, the flange 1110 of the bonding clamp 1004 clamped against the upper surface 1304 of the solar panel module 1302 in coordination with the lateral edge support portion 1102 of the boss 1128 clamped against the lateral edge portion 1306 of the solar panel module 1302. FIG. 14 illustrates the lateral edge support portion 1130 of the boss 1128 having the first surface 1134 facing and/or aligning the solar panel module 1302. While FIG. 14 illustrates the clamp assembly 1002 mounting a portion of one solar panel module 1302, the clamp assembly 1002 may mount a portion of a second solar panel module 1302 (discussed in more detail below with regard to FIG. 18).

Figure 15:
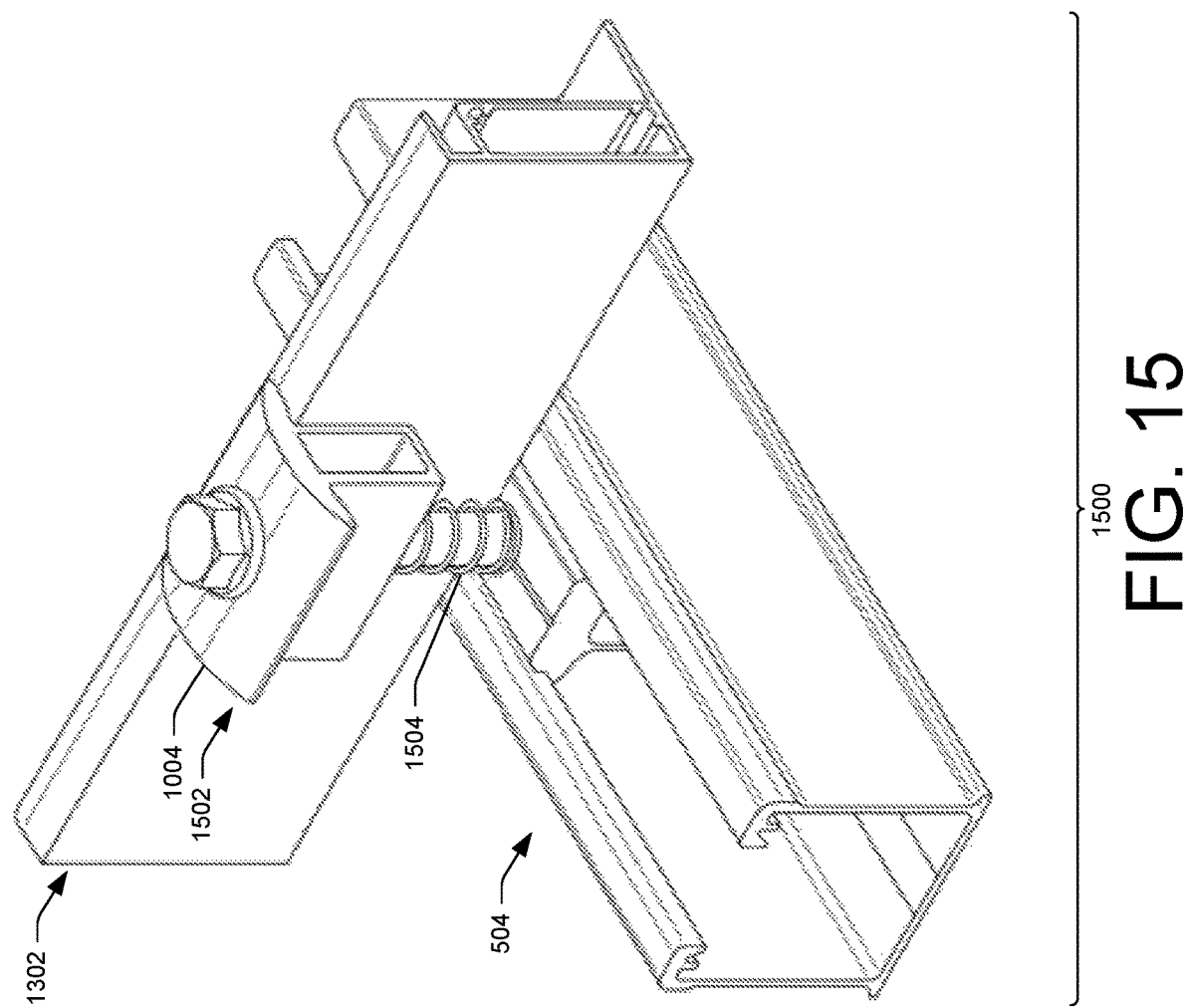
FIG. 15 illustrates a top perspective view of another embodiment of a clamp assembly connected to a rail segment of FIG. 7, according to an embodiment in this disclosure, for mounting a solar panel module on the rail segment.

FIG. 15 illustrates a top perspective view 1500 of a clamp assembly 1502 for mounting the portion of a solar panel module 1302 on the rail segment 504. The clamp assembly 1502 is similar to the clamp assembly 1002 shown in FIG. 10. Inasmuch as other components of the clamp assembly 1502 are similar to those of clamp assembly 1002, the reference numbers remain the same on the same parts for convenience. The clamp assembly 1502 including a biasing component 1504, such as a spring. The biasing component 1504 to provide for temporarily holding the clamp assembly 1502 in position until the clamp assembly 1502 is tightened to the solar panel module 1302 and or the rail segment 504.

Figure 16:
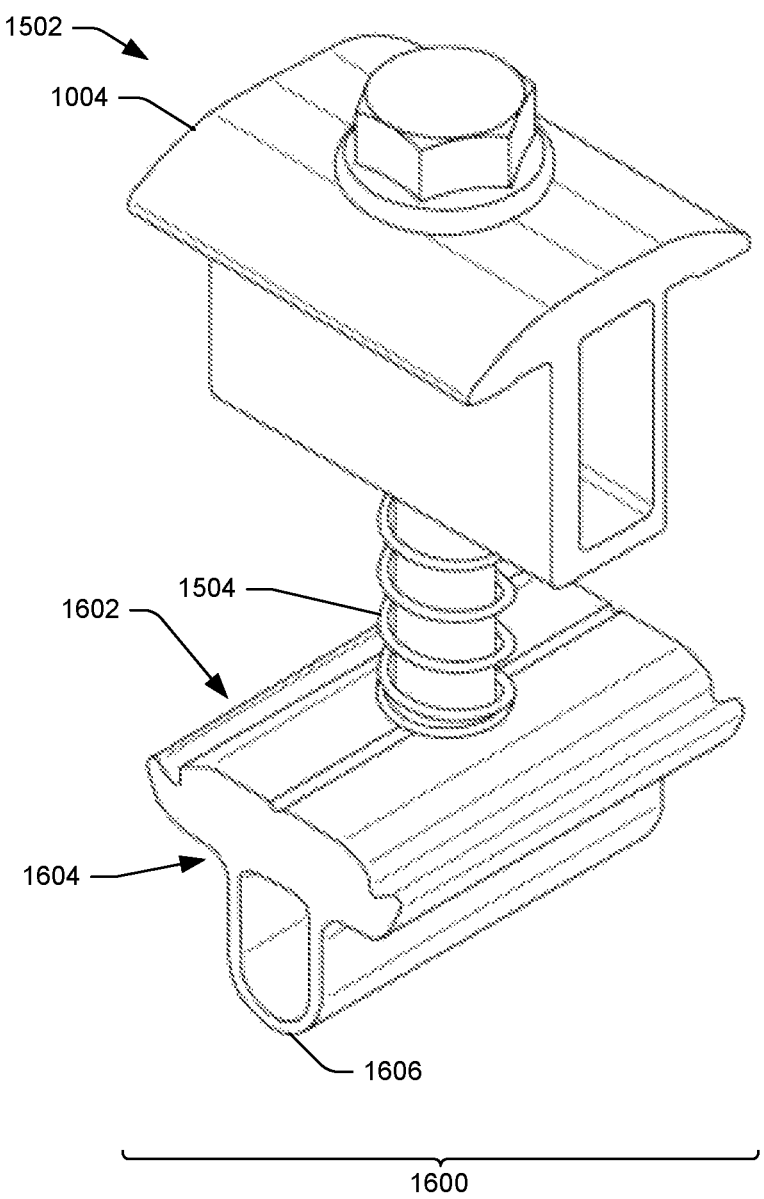
FIG. 16 illustrates a top perspective view of the clamp assembly of FIG. 15, according to an embodiment in this disclosure.

FIG. 16 illustrates a top perspective view 1600 of the clamp assembly 1502. FIG. 16 illustrates the clamp assembly 1502 may include a connection member 1602. Here in this embodiment, the connection member 1602 may include a bottom surface 1604 having a convex shape 1606 in a side profile thereof to provide for managing wire disposed in the rail segment 504. The biasing component 1504 may provide for forcing the bonding clamp 1004 into a position relative to the connection member 1602 during installation of the clamp assembly 1502 with the rail segment 504 and/or during installation of the solar panel module 1302 with the clamp assembly 1502.

Figure 17:
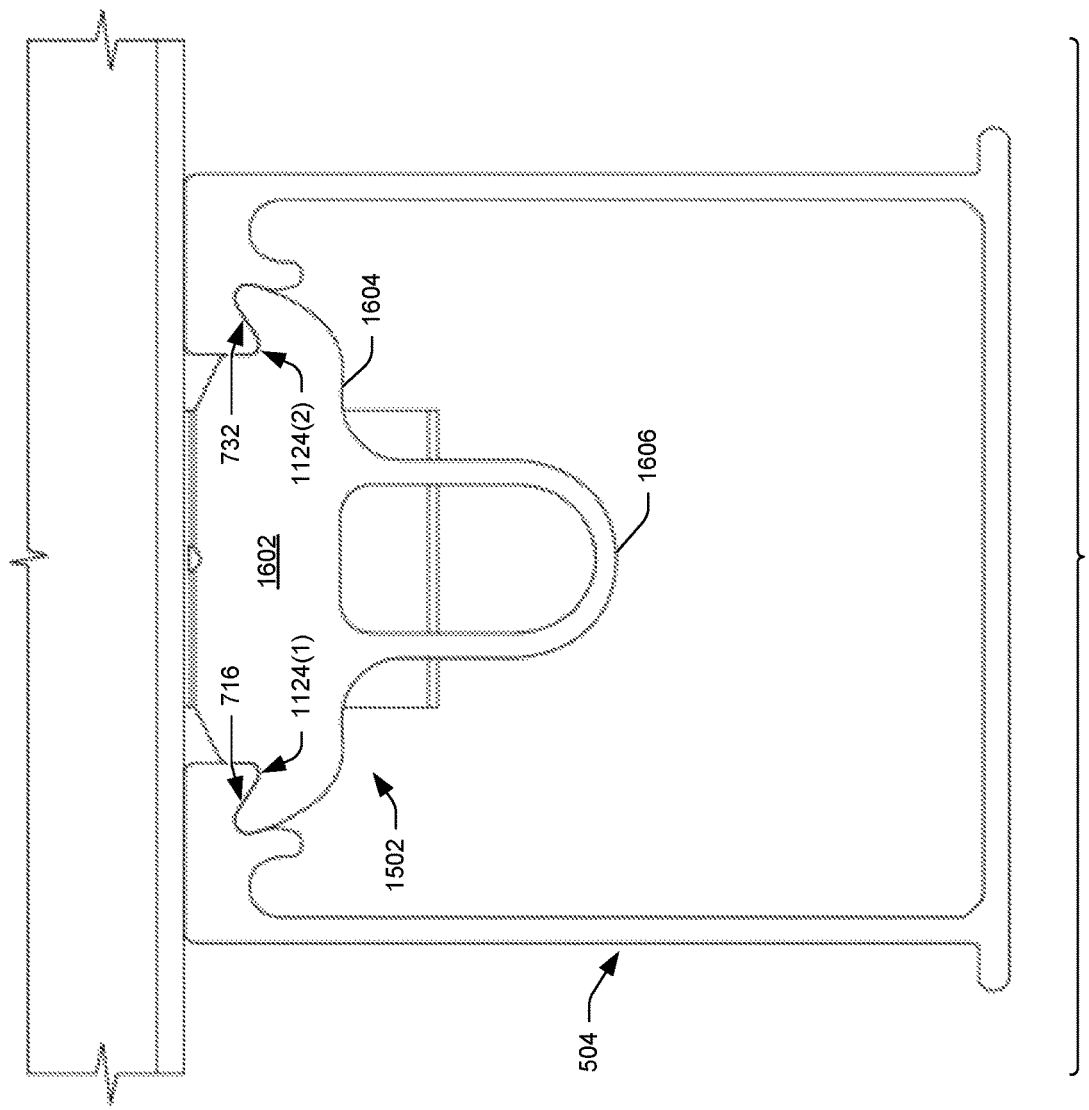
FIG. 17 illustrates a partial end view of the clamp assembly of FIG. 15 engaged with the rail segment, according to an embodiment in this disclosure.

FIG. 17 illustrates an end view 1700 of the clamp assembly 1502 clamped to the rail segment 504. FIG. 17 illustrates the connection member 1602 including the bottom surface 1604 having the convex shape 1606 of the clamp assembly 1502 clamped to the second inner groove 716 and fourth inner groove 732 of the rail segment 504. For example, similar to connection members 1008 and 1206, connection member 1602 includes the first groove 1124(1) to clamp against the second inner groove 716 of the rail segment 504 and the second groove 1124(2) to clamp against the fourth inner groove 732 of the rail segment 504.

Figure 18:
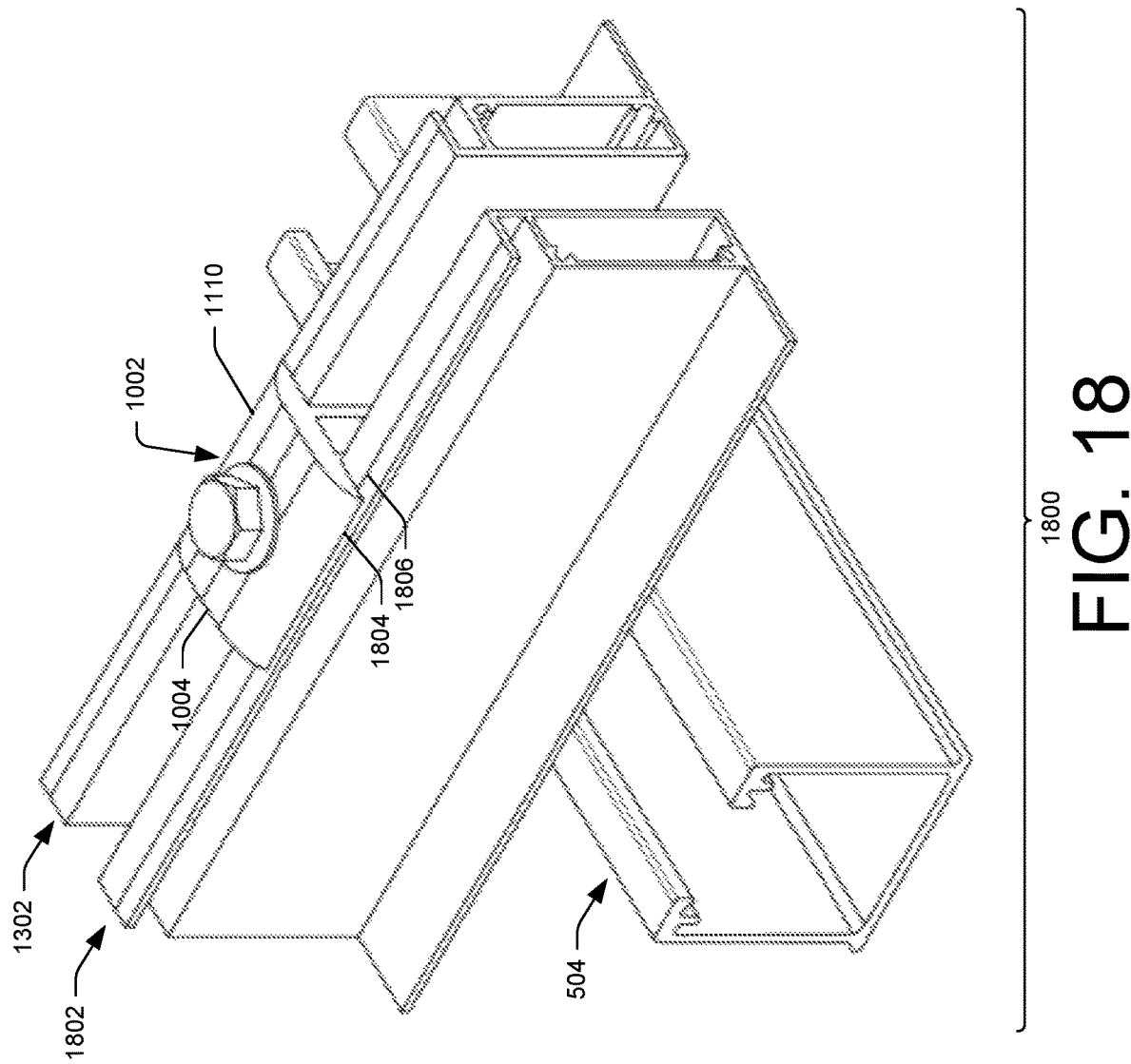
FIG. 18 illustrates a top perspective view of a clamp assembly used as a mid-clamp for mounting adjacent solar panel modules on a rail segment, according to an embodiment in this disclosure.

FIG. 18 illustrates a top perspective view 1800 of the clamp assembly 1002 mounting the portion of the solar panel module 1302 on the rail segment 504 and mounting another portion of another solar panel module 1802 on the rail segment 504. FIG. 18 illustrates the bonding clamp 1004 may include another flange 1804 extending in an opposite direction to the flange 1110 to clamp against an upper surface 1806 of the other module 1802. As discussed above, the flanges 1110 and 1804 of the bonding clamp 1004 may include one or more bonding protrusions (e.g., bonding pins, serrations, teeth, etc.) disposed on the underside surface of the flange 1110 for puncturing or compromising an anodized layer, a galvanized layer, a painted layer, etc. of a module to electrically bond with the solar panel modules 1302 and 1802.

Figure 19:
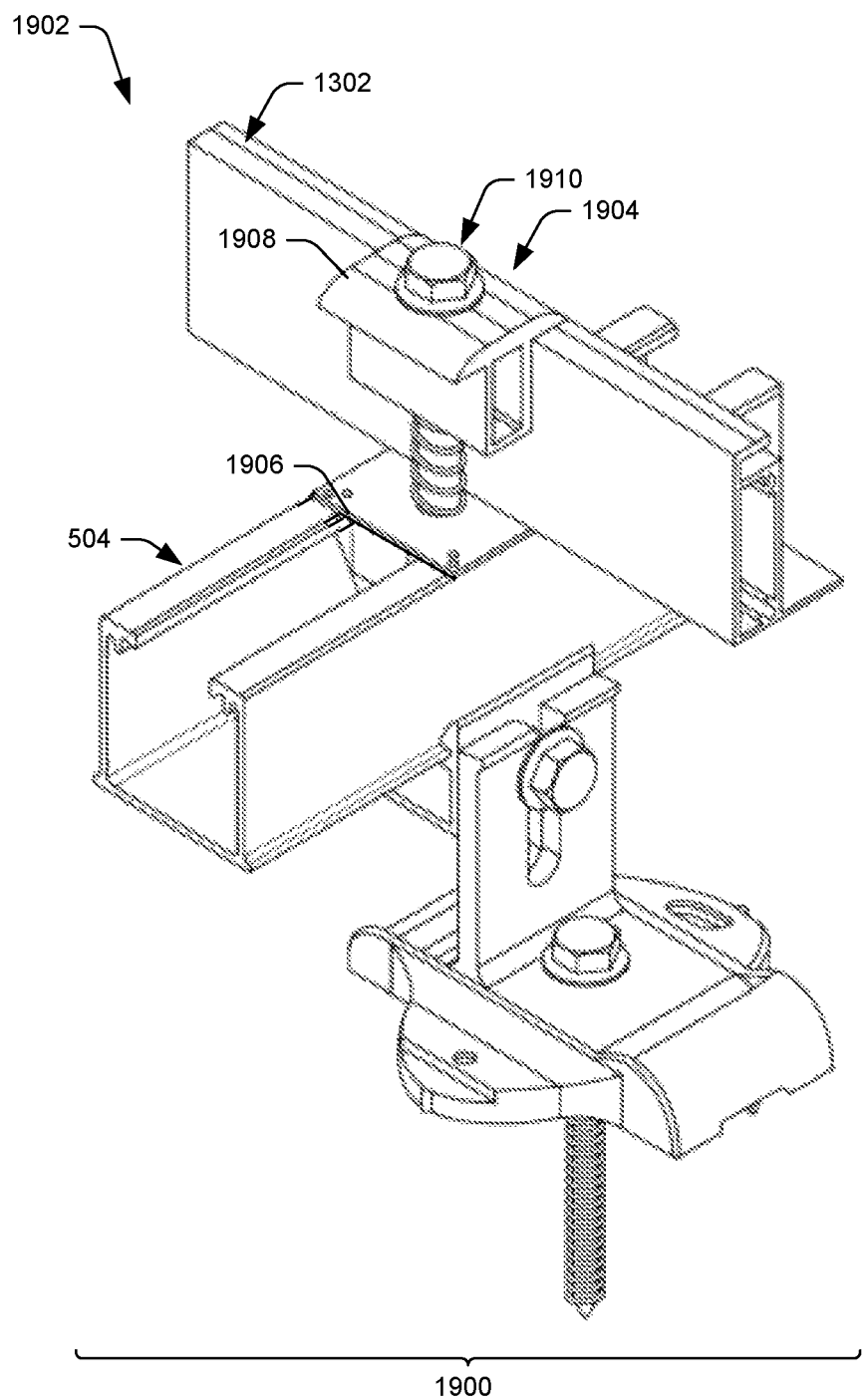
FIG. 19 illustrates a top perspective view of another embodiment of a mounting system for mounting a solar panel module on roof or other surface (not shown), according to an embodiment in this disclosure.

FIG. 19 illustrates a top perspective view 1900 of another exemplary mounting system 1902 for mounting the solar panel module 1302 on the rail segment 504. The mounting system 1902 may include a clamp assembly 1904 for mounting the portion of the solar panel module 1302 on the rail segment 504. The clamp assembly 1904 may be similar to the clamp assemblies 1002, 1202, and/or 1502. Inasmuch as other components of the clamp assembly 1904 are similar to those of clamp assemblies 1002, 1202, and/or 1502 the reference numbers remain the same on the same parts for convenience. Here, in this embodiment, the clamp assembly 1904 may include a bonding washer 1906. The bonding washer 1906 may be connected to the bonding clamp 1908 via a fastener 1910. Similar to bonding clamps 1004 and bonding clamp 1204, the bonding clamp 1908 is configured to clamp against the solar panel module 1302. The bonding washer 1906 rests on a top surface the rail segment 504. The solar panel module 1302 rests on a top surface of the bonding washer 1906. The bonding washer 1906 may couple to the rail segment 504 via one or more bonding protrusions (discussed in more detail below with regard to FIG. 20). The bonding washer 1906 may electrically bond the solar panel module 1302 with the rail segment 1302.

Figure 20:
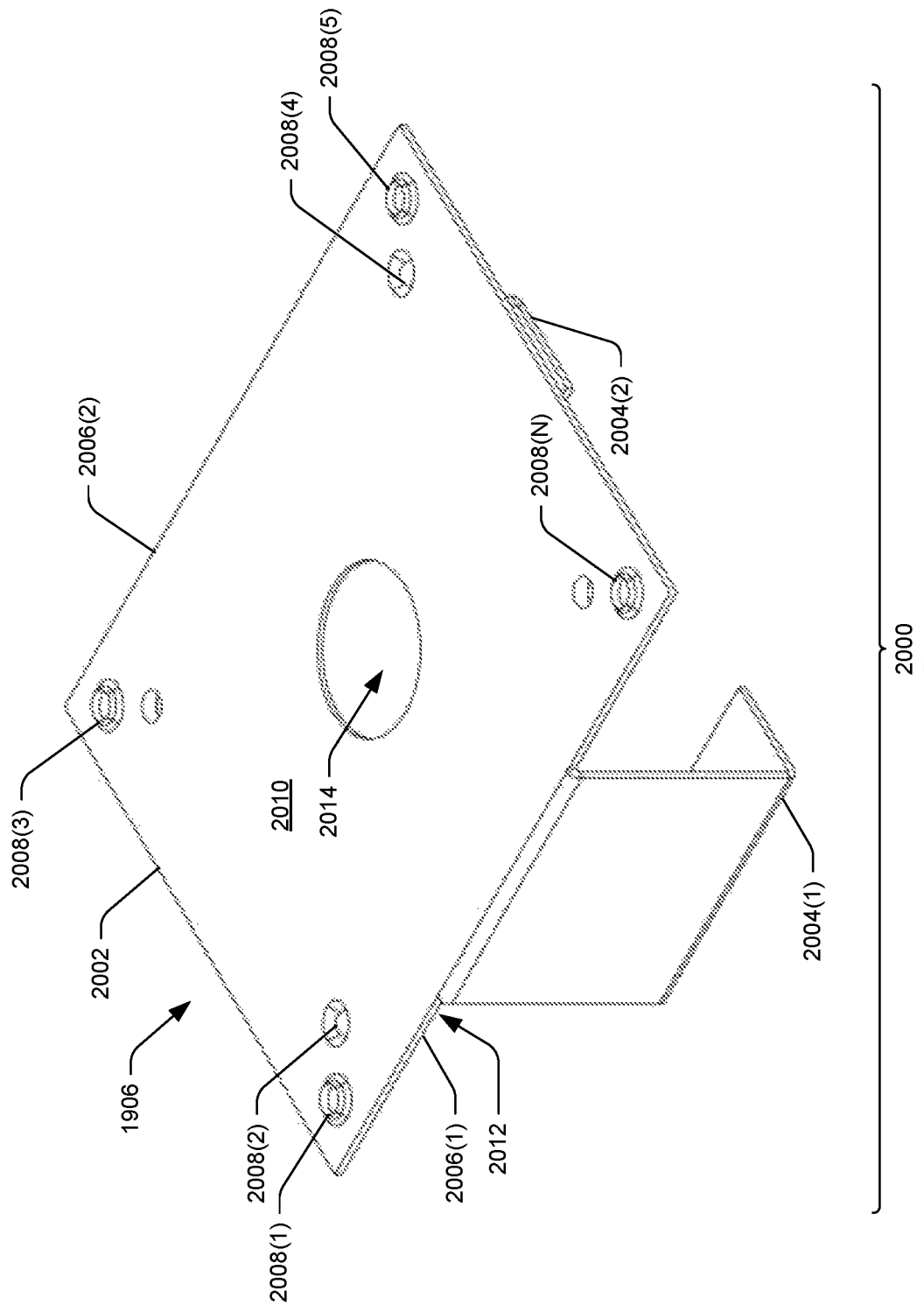
FIG. 20 illustrates a top perspective view of a bonding washer of the mounting system of FIG. 19, according to an embodiment in this disclosure.

FIG. 20 illustrates a top perspective view 2000 of the bonding washer 1906 of the mounting system 1902. The bonding washer 1906 may include a top member 2002 for mounting on top of a rail segment (e.g., the rail segment 504). The top member 2002 may be substantially planar and may include a pair of opposing tabs 2004(1) and 2004(2) that extend from opposing edges 2006(1) and 2006(2) of the top member 2002. The pair of opposing tabs 2004(1) and 2004(2) may extend from the opposing edges 2006(1) and 2006(2) to hook around a portion of a connection member (e.g., a rail nut) (not shown).

For example, the pair of opposing tabs 2004(1) and 2004(2) may extend from the opposing edges 2006(1) and 2006(2) of the top member 2002 to be disposed between the first vertical wall 702 and the second vertical wall 718 of the rail segment 504 to hook around first and second ends of a connection member slidably received by the second and fourth inner grooves 716 and 732 of the rail segment 504 such that the connection member may be secured at a desired location along the rail segment 504.

The bonding washer 1906 may include one or more bonding protrusions 2008(1), 2008(2), 2008(3), 2008(4), 2008(5), and 2008(n) (e.g., bonding pins, serrations, teeth, etc.) disposed in a top surface 2010 and/or a bottom surface 2012 of the top member 2002 for puncturing or compromising an anodized layer, a galvanized layer, a painted layer, etc. of a module to electrically bond with module. The one or more protrusions 2008(1)-2008(n), on the bonding washer 1906 enable penetration of non-conductive anodization finish on aluminum rail and thus the bonding washer 1906 imbed into rail aluminum and provide an electrical bond between the rail and bonding washer 1906, and by clamp assembly 1904 to fastener 1910 and also by through one or more protrusions (e.g., serrations, teeth, etc.) arranged on the underside of the head of fastener 1910, penetrate anodization on flanges, thus bonding all the aforementioned items to clamp 1908. The clamp 1908, bonds to a module through a pin disposed on underside surfaces of the clamp 1908.

One or more of the one or more protrusions 2008(1)-2008(n) on the bonding washer 1906 may extend up one way above the top surface 2010 while one or more of the one or more protrusions 2008(1)-2008(n) on the bonding washer 1906 may extend down one way below the bottom surface 2012. The one or more protrusions 2008(1)-2008(n) on the bonding washer 1906 that extend up one way above the top surface 2010 may provide for penetration of non-conductive anodization finish on one or more modules (e.g., solar panel module 1302). The one or more protrusions 2008(1)-2008(n) on the bonding washer 1906 that extend down one way below the bottom surface 2012 may provide for penetration of non-conductive anodization finish on one or more rails (e.g., rail segment 504).

The bonding washer 1906 may include a through-hole 2014. The through-hole 2014 may be positioned in a middle of the bonding washer 1906. The through-hole may provide for receiving a portion of the fastener 1910 such that the bonding washer 1906 may be connected to the bonding clamp 1908.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A mounting system for mounting a solar panel module to a rail segment, the mounting system comprising:
    a base having a top portion and a bottom portion opposite the top portion, the base including:
        a cavity formed within the base and open to the bottom portion, and
        an opening disposed in the top portion and extending to the cavity; and
    a mounting bracket configured to reside at least partially over the top portion, the mounting bracket including a through-hole that aligns with the opening, the through-hole and the opening being configured to receive a fastener for securing the base and the mounting bracket against a mounting surface, and a stanchion extending from a footing portion configured to straddle at least a portion of the base, the stanchion being configured to receive a clamp for securing the rail segment to the mounting bracket.

2. The mounting system according to claim 1, the base further including a collar disposed with the opening, and wherein at least a portion of the collar is received by the through-hole of the mounting bracket.

3. The mounting system according to claim 1, wherein the footing portion defines a channel that is configured to reside at least partially over the top portion.

4. The mounting system according to claim 3, wherein the mounting bracket includes a first foot and a second foot, the channel being interposed between the first foot and the second foot.

5. The mounting system according to claim 1, wherein the through-hole is disposed through the footing portion adjacent to the stanchion to align with the opening of the base and accommodate the fastener therein to secure the base and the mounting bracket against the mounting surface.

6. The mounting system according to claim 1, further comprising the clamp, the clamp including:
    a vertical wall;
    a horizontal flange extending from the vertical wall;
    a web section extending from the horizontal flange; and
    a first groove disposed in a lip extending from the web section,
    wherein when the clamp receives the rail segment to secure the rail segment to the mounting bracket, at least a first protrusion of the rail segment is received by the first groove disposed in the lip of the clamp and the horizontal flange is urged to displace the first groove disposed in the lip such that at least a second protrusion of the rail segment is received by a second groove disposed in the vertical wall.

7. A mounting system for mounting a solar panel module on a rail segment, the mounting system comprising:
    a base, having a top portion and a bottom portion opposite the top portion, the base including:
        a cavity within the base and open to the bottom portion of the base, and
        an opening; and
    a mounting bracket including:
        a footing portion configured to straddle at least a portion of the base, the footing portion having a first foot disposed on a first side of the base and a second foot disposed on a second side of the base, wherein the footing portion defines a channel that is configured to reside at least partially over the top portion,
        a through-hole extending through the footing portion to align with the opening, and
        a stanchion extending from the footing portion, the stanchion having a slot configured to receive a fastener of a clamp for securing the rail segment to the mounting bracket.

8. The mounting system according to claim 7, wherein the stanchion includes a first vertical arm and a second vertical arm, the first vertical arm having a first smooth planar inside surface and the second vertical arm having a second smooth planar inside surface, the first smooth planar inside surface facing the second smooth planar inside surface to define the slot configured to slidably receive the fastener of the clamp.

9. The mounting system according to claim 7, wherein the through-hole is disposed through the footing portion adjacent to the stanchion to align with the opening of the base and accommodate a surface fastener therein to secure the base and the mounting bracket against a mounting surface.

10. The mounting system according to claim 7, further comprising the clamp, the clamp including:
    a vertical wall;
    a horizontal flange extending from the vertical wall;

a web section extending from the horizontal flange; and
a first groove disposed in a lip extending vertically from the web section,
wherein when the clamp receives the rail segment to secure the rail segment to the mounting bracket, at least a first protrusion of the rail segment is received by the first groove disposed in the lip of the clamp and the horizontal flange is urged to displace the first groove disposed in the lip such that at least a second protrusion of the rail segment is received by a second groove disposed in the vertical wall.

11. A mounting system for mounting a solar panel module on a rail segment, the mounting system comprising:
a base, having a top portion opposite a bottom portion, the base including a cavity within the base and open to the bottom portion of the base;
a mounting bracket including a stanchion, wherein the mounting bracket is configured to straddle at least a portion of the base; and
a clamp configured to secure the rail segment to the mounting bracket, wherein the stanchion slidably receives the clamp, the clamp including:
a vertical wall,
a horizontal flange extending from the vertical wall,
a web section extending from the horizontal flange, and
a first groove disposed in a lip extending from the web section,
wherein when the clamp receives the rail segment to secure the rail segment to the mounting bracket, at least a first protrusion of the rail segment is received by the first groove disposed in the lip of the clamp and the horizontal flange is urged to displace the first groove disposed in the lip such that at least a second protrusion of the rail segment is received by a second groove in the vertical wall.

12. The mounting system according to claim 11, the mounting bracket further including a footing portion, wherein the footing portion defines a channel that is configured to reside at least partially over the base.

13. The mounting system according to claim 12, wherein the base further including:
a port extending from the top portion of the base into the cavity within the base, and
a vent disposed in the top portion of the base and extending to the cavity,
wherein the port is configured to receive an injected sealant to fill the cavity with the injected sealant, thereby sealing around a penetration in a mounting surface created by a surface fastener, the injected sealant forcing air from inside the cavity out of the vent to ensure the injected sealant completely fills the cavity.

14. The mounting system according to claim 13, wherein the footing portion is shaped to straddle across the base between the port of the base and the vent of the base.

15. The mounting system according to claim 11, wherein the stanchion includes a first vertical arm and a second vertical arm, the first vertical arm having a first smooth planar inside surface and the second vertical arm having a second smooth planar inside surface, the first smooth planar inside surface facing the second smooth planar inside surface to define a slot configured to slidably receive a fastener of the clamp.

16. A rail system for mounting a solar panel module to a mounting surface, the rail system comprising:
a rail segment configured to connect to a clamp, the rail segment including:
a first vertical wall that extends in a first direction, the first vertical wall having:
a first outside surface,
a first inside surface,
a first protrusion extending from the first outside surface of the first vertical wall at a bottom portion of the first vertical wall, the first protrusion being receivable by a first groove of the clamp,
a first inner groove disposed at a top end of the first inside surface, the first inner groove being configured to receive a first portion of a splice rail,
a second inner groove disposed at the top end of the first inside surface of the first vertical wall, the second inner groove being configured to receive a first portion of a rail nut, the second inner groove being laterally adjacent to the first inner groove such that the first inner groove is more proximate to the first inside surface of the first vertical wall than the second inner groove,
a second vertical wall that extends in a second direction adjacent to the first direction of the first vertical wall, the second vertical wall having:
a first outside surface,
a first inside surface,
a second protrusion extending from the first outside surface of the second vertical wall at a bottom portion of the second vertical wall, the second protrusion being receivable by a second groove of the clamp,
a third inner groove disposed at a top end of the first inside surface of the second vertical wall, the third inner groove being configured to receive a second portion of the splice rail, and
a fourth inner groove disposed at the top end of the first inside surface of the second vertical wall, the fourth inner groove being configured to receive a second portion of the rail nut, the fourth inner groove being laterally adjacent to the third inner groove such that the third inner groove is more proximate to the first inside surface of the second vertical wall than the fourth inner groove, and
a base extending in a direction transverse to the first direction of the first vertical wall and the second direction of the second vertical wall, the base being integrally formed with the bottom portion of the first vertical wall and the bottom portion of the second vertical wall.

17. The rail system according to claim 16, wherein:
the rail segment is a first rail segment; and
the rail system further comprises:
a second rail segment, and
the splice rail configured to connect the first rail segment to the second rail segment, the splice rail including:
a first vertical wall that extends in a first direction,
a second vertical wall that extends in a second direction adjacent to the first direction of the first vertical wall,
a horizontal base of the splice rail extending in a direction transverse to the first vertical wall of the splice rail and the second vertical wall of the splice rail, the horizontal base of the splice rail integrally formed with a bottom portion of the first vertical wall of the splice rail and the second vertical wall of the splice rail, and
a fastener disposed in the horizontal base of the splice rail such that a head of the fastener is disposed between the first vertical wall of the splice rail and the second vertical wall of the splice rail and disposed on top of a surface of the horizontal base of the splice rail.

18. The rail system according to claim 16, wherein the clamp includes:
a third vertical wall that extends in a third direction, the third vertical wall having a planar surface;
the first groove, wherein the first groove extends from the third vertical wall opposite the planar surface;
a horizontal flange extending from the third vertical wall in a fourth direction that is transverse to the third direction;
a web section extending from the horizontal flange;
a lip extending from the web section; and
the second groove, wherein the second groove is disposed in the lip,
wherein when the clamp receives the rail segment to secure the rail segment to a mounting bracket, at least the first protrusion of the rail segment is received by the second groove and the horizontal flange is urged to displace the second groove such that at least the second protrusion of the rail segment is received by the first groove.

19. The rail system according to claim 16, further comprising a mounting bracket, the mounting bracket being configured to mount at least partially over a base, the mounting bracket including:
a footing portion shaped to straddle across at least a portion of the base;
a first foot extending from a first side of the footing portion;
a second foot extending from a second side of the footing portion;
a through-hole extending through the footing portion, the through-hole being configured to align with an opening of the base; and
a stanchion extending from the footing portion, the stanchion having a slot configured to receive a fastener of the clamp for securing the rail segment to the mounting bracket.

20. The rail system according to claim 19, wherein the stanchion includes a first vertical arm and a second vertical arm, the first vertical arm having a first smooth planar inside surface and the second vertical arm having a second smooth planar inside surface, the first smooth planar inside surface facing the second smooth planar inside surface to define a slot configured to slidably receive the fastener of the clamp.

21. The rail system according to claim 19, further comprising the base, the base having a top portion and a bottom portion opposite the top portion, the base including:
a cavity formed within the base and open to the bottom portion,
a port extending from the top portion into the cavity within the base, and
a vent disposed in the top portion of the base and extending to the cavity.

22. The rail system according to claim 21, wherein the port is configured to receive an injected sealant to fill the cavity with the injected sealant, thereby sealing around a penetration in a mounting surface created by a fastener, the injected sealant forcing air from inside the cavity out of the vent to ensure the injected sealant completely fills the cavity.

23. The rail system according to claim 19, wherein the footing portion defines a channel that is configured to reside at least partially over the base.

24. A rail system for mounting a solar panel module to a mounting surface, the rail system comprising:
a rail segment including:
a first vertical wall that extends in a first direction, the first vertical wall having:
a first outside surface,
a first inside surface,
a first protrusion extending from the first outside surface,
a first inner groove disposed at a top end of the first inside surface, the first inner groove being configured to receive a first portion of a splice rail, and
a second inner groove disposed at the top end of the first inside surface laterally adjacent to the first inner groove such that the first inner groove is more proximate to the first inside surface than the second inner groove, the second inner groove being configured to receive a first portion of a rail nut,
a second vertical wall that extends in a second direction adjacent to the first direction of the first vertical wall, the second vertical wall having:
a second outside surface,
a second inside surface,
a second protrusion extending from the second outside surface,
a third inner groove disposed at a top end of the second inside surface, the third inner groove being configured to receive a second portion of the splice rail, and
a fourth inner groove disposed at the top end of the second inside surface laterally adjacent to the third inner groove such that the third inner groove is more proximate to the second inside surface than the fourth inner groove, the fourth inner groove being configured to receive a second portion of the rail nut, and
a horizontal base extending in a third direction transverse to the first direction and the second direction, the horizontal base being integrally formed with the first vertical wall and the second vertical wall; and
a clamp configured to connect to a mounting bracket mounted on the mounting surface, the clamp including:
a third vertical wall,
a first groove disposed in the third vertical wall,
a horizontal flange extending from the third vertical wall,
a web section extending from the horizontal flange,
a lip extending from the web section, and
a second groove disposed in the lip, the second groove being configured to receive the first protrusion;
wherein when the clamp receives the rail segment to secure the rail segment to the mounting bracket, at least the first protrusion of the rail segment is received by the second groove and the horizontal flange is urged to displace the second groove such that at least the second protrusion of the rail segment is received by the first groove.

25. The rail system according to claim 24, wherein:
the rail segment is a first rail segment; and
the rail system further comprises:
a second rail segment, and
a splice rail configured to connect the first rail segment to the second rail segment, the splice rail including:
a first vertical wall that extends in a first direction, a second vertical wall that extends in a second direction adjacent to the first direction of the first vertical wall, a base of the splice rail extending in a direction transverse to the first vertical wall of the splice rail and the second vertical wall of the splice rail, the base of the splice rail integrally formed with a bottom portion of the first vertical wall of the splice rail and the second vertical wall of the splice rail, and a fastener disposed in the base of the splice rail such that a head of the fastener is disposed between the first vertical wall of the splice rail and the second vertical wall of the splice rail and disposed on top of a surface of the base of the splice rail.

26. The rail system according to claim 24, further comprising the mounting bracket, the mounting bracket including a footing portion that defines a channel that is configured to reside at least partially over a base.

27. The rail system according to claim 26, wherein a stanchion extends from the footing portion, the stanchion including a first vertical arm and a second vertical arm, the first vertical arm having a first smooth planar inside surface and the second vertical arm having a second smooth planar inside surface, the first smooth planar inside surface facing the second smooth planar inside surface to define a slot configured to slidably receive a fastener of the clamp.

28. The rail system according to claim 26, further comprising the base, the base having a top portion and a bottom portion opposite the top portion, the base including:
a cavity formed within the base and open to the bottom portion,
a port extending from the top portion of the base into the cavity within the base, and
a vent disposed in the top portion of the base and extending to the cavity.

29. The rail system according to claim 28, wherein the footing portion is further shaped to straddle across a width direction of the base between the port of the base and the vent of the base.

30. A rail system for mounting a solar panel module to a mounting surface, the rail system comprising:
a first rail segment including:
a first vertical wall that extends in a first direction, the first vertical wall having:
a first outside surface,
a first inside surface,
a first inner groove disposed at a top end of the first inside surface,
a second inner groove disposed at the top end of the first inside surface of the first vertical wall, the second inner groove being configured to receive a first portion of a rail nut, the second inner groove being laterally adjacent to the first inner groove such that the first inner groove is more proximate to the first inside surface than the second inner groove,
a second vertical wall that extends in a second direction adjacent to the first direction of the first vertical wall, the second vertical wall having:
a second outside surface,
a second inside surface,
a third inner groove disposed at a top end of the second inside surface of the second vertical wall, and
a fourth inner groove disposed at the top end of the second inside surface of the second vertical wall, the fourth inner groove being configured to receive a second portion of the rail nut, the fourth inner groove being laterally adjacent to the third inner groove such that the third inner groove is more proximate to the second inside surface than the fourth inner groove,
a horizontal base extending in a direction transverse to the first direction of the first vertical wall and the second direction of the second vertical wall, the horizontal base being integrally formed with a bottom portion of the first vertical wall and a bottom portion of the second vertical wall;
a second rail segment; and
a splice rail,
wherein the splice rail is configured to connect the first rail segment to the second rail segment, such that the first inner groove receives a top portion of a first vertical wall of the splice rail and the third inner groove receives a top portion of a second vertical wall of the splice rail.

31. The rail system according to claim 30, the splice rail including:
a horizontal base of the splice rail extending in a direction transverse to the first vertical wall of the splice rail and the second vertical wall of the splice rail, the horizontal base of the splice rail integrally formed with a bottom portion of the first vertical wall of the splice rail and the second vertical wall of the splice rail, and
a fastener disposed in the horizontal base of the splice rail such that a head of the fastener is disposed between the first vertical wall of the splice rail and the second vertical wall of the splice rail and disposed on top of a surface of the horizontal base of the splice rail, the fastener for locking the splice rail to the first rail segment or the second rail segment.

32. The rail system according to claim 30, further comprising the rail nut, wherein when the second inner groove and the fourth inner groove respectively receive the first portion and the second portion of the rail nut, a bonding clamp attached to the rail nut is configured to clamp against the solar panel module.

33. The rail system according to claim 30, further comprising a clamp configured to connect to a mounting bracket to be secured to the mounting surface, and wherein the first rail segment further includes:
a first protrusion extending from the first outside surface at a bottom portion of the first vertical wall,
a second protrusion extending from the second outside surface at a bottom portion of the second vertical wall, and
the clamp including:
a third vertical wall,
a first groove disposed in the third vertical wall,
a horizontal flange extending from the third vertical wall,
a web section extending from the horizontal flange,
a lip extending vertically from the web section, and
a second groove disposed in the lip, the second groove being configured to receive the first protrusion;
wherein when the clamp receives the first rail segment to secure the first rail segment to the mounting bracket, at least the first protrusion of the first rail segment is received by the second groove and the horizontal flange is urged to displace the second groove such that at least the second protrusion of the first rail segment is received by the second groove.

34. The rail system according to claim 33, further comprising the mounting bracket, the mounting bracket being configured to mount at least partially over a base, the mounting bracket including:
 a footing portion shaped to straddle across at least a portion of the base;
 a first foot extending from a first side of the footing portion;
 a second foot extending from a second side of the footing portion;
 a through-hole extending through the footing portion, the through-hole being configured to align with an opening of the base; and
 a stanchion extending from the footing portion, the stanchion having a slot configured to receive a fastener of the clamp for securing the first rail segment to the mounting bracket.

35. The rail system according to claim 34, further comprising the base, the base having a top portion of the base and a bottom portion of the base opposite the top portion, the base including:
 a cavity formed within the base and open to the bottom portion of the base,
 a port extending from the top portion of the base into the cavity within the base, and
 a vent disposed in the top portion of the base and extending to the cavity.

36. A clamp assembly for mounting a solar panel module on a rail segment, the clamp assembly comprising:
 a bonding clamp including:
  a lateral edge support portion that extends in a first direction to engage a lateral edge of the solar panel module, and
  a flange that extends in a second direction transverse to the first direction to engage an upper surface of the solar panel module;
 a fastener having a first end opposite a second end, the first end configured to interface with a top surface of the flange; and
 a rail nut attached to the second end of the fastener, the rail nut including:
  a first end,
  a second end opposite the first end,
  a first side extending between the first end of the rail nut and the second end of the rail nut, the first side configured to engage with a first inner groove of the rail segment,
  a second side extending between the first end of the rail nut and the second end of the rail nut, the second side configured to engage with a second inner groove of the rail segment,
  a top surface of the rail nut extending between the first end of the rail nut and the second end of the rail nut, and
  a boss extending from the top surface of the rail nut, the boss having a second lateral edge support portion that extends in a third direction parallel to the first direction of the lateral edge support portion of the bonding clamp.

37. The clamp assembly according to claim 36, wherein the rail nut further includes:
 a bottom surface opposite the top surface and extending between the first end of the rail nut and the second end of the rail nut,
 wherein the bottom surface is defined by a concave shape or a convex shape.

38. The clamp assembly according to claim 36, wherein the rail nut further includes:
 a bottom surface opposite the top surface and extending between the first end of the rail nut and the second end of the rail nut, wherein the bottom surface has a thin protruding wall.

39. The clamp assembly according to claim 36, wherein the flange is a first flange, and the solar panel module is a first solar panel module, and
 wherein the bonding clamp further includes a second flange that extends in a fourth direction parallel to the second direction to clamp against an upper surface of a second solar panel module.

40. The clamp assembly according to claim 36, further comprising a stabilizing component disposed between the bonding clamp and the rail nut, the stabilizing component configured to hold the rail nut in position during installation of the clamp assembly with the rail segment.

41. The clamp assembly according to claim 36, further comprising the rail segment, the rail segment including:
 a first vertical wall that extends in a first direction, the first vertical wall having an outside surface opposite an inside surface,
 the first inner groove disposed at a top end of the inside surface of the first vertical wall adjacent to a third inner groove such that the third inner groove is located more proximate to the inside surface than the first inner groove, the third inner groove configured to receive a first portion of a splice rail,
 a second vertical wall that extends in a second direction parallel to the first direction of the first vertical wall, the second vertical wall having an outside surface opposite an inside surface,
 the second inner groove disposed at a top end of the inside surface of the second vertical wall adjacent to a fourth inner groove such that the fourth inner groove is located more proximate to the inside surface than the second inner groove, the fourth inner groove configured to receive a second portion of the splice rail, and
 a horizontal base extending in a direction transverse to the first direction of the first vertical wall and the second direction of the second vertical wall, the horizontal base being integrally formed with a bottom portion of the first vertical wall and a bottom portion of the second vertical wall.

42. A clamp assembly for mounting a first solar panel module and a second solar panel module on a rail segment, the clamp assembly comprising:
 a bonding clamp including:
  a first lateral edge support portion that extends in a first direction to support against a first lateral edge of the first solar panel module,
  a first flange that extends in a second direction transverse to the first direction to clamp against a first upper surface of the first solar panel module,
  a second lateral edge support portion that extends in a third direction parallel to the first direction to support against a second lateral edge of the second solar panel module,
  a second flange that extends in a fourth direction transverse to the third direction to clamp against a second upper surface of the second solar panel module;
 a fastener having a first end opposite a second end, the first end configured to interface with the bonding clamp at a location between the first flange and the second flange; and a rail nut attached to the second end of the fastener, the rail nut having:
a first end,
a second end opposite the first end,
a first side arranged between the first end of the rail nut and the second end of the rail nut, the first side including a first portion to clamp against a first inner groove of the rail segment,
a second side arranged between the first end of the rail nut and the second end of the rail nut, the second side including a second portion to clamp against a second inner groove of the rail segment,
a top surface extending between the first end of the rail nut and the second end of the rail nut,
a boss extending from the top surface, the boss including:
a third lateral edge support portion that extends in a fifth direction parallel to the first direction of the first lateral edge support portion of the bonding clamp, and
a fourth lateral edge support portion that extends in a sixth direction parallel to the third direction of the second lateral edge support portion of the bonding clamp.

43. The clamp assembly according to claim 42, further comprising a stabilizing component disposed between the bonding clamp and the rail nut, the stabilizing component to hold the rail nut in position during installation of the clamp assembly with the rail segment.

44. The clamp assembly according to claim 42, further comprising the rail segment, the rail segment including:
a first vertical wall that extends in a first direction, the first vertical wall having an outside surface opposite an inside surface,
the first inner groove disposed at a top end of the inside surface of the first vertical wall laterally adjacent to a third inner groove of the rail segment such that the third inner groove is located more proximate to the inside surface than the first inner groove, the first inner groove configured to receive a first portion of a splice rail,
a second vertical wall that extends in a second direction adjacent to the first direction of the first vertical wall, the second vertical wall having an outside surface opposite an inside surface,
the second inner groove disposed at a top end of the inside surface of the second vertical wall laterally adjacent to a fourth inner groove of the rail segment such that the fourth inner groove is located more proximate to the inside surface than the second inner groove, the fourth inner groove configured to receive a second portion of the splice rail, and
a horizontal base extending in a direction transverse to the first direction of the first vertical wall and the second direction of the second vertical wall, the horizontal base being integrally formed with a bottom portion of the first vertical wall and a bottom portion of the second vertical wall.

45. The clamp assembly according to claim 42, wherein the rail nut further includes:
a bottom surface opposite the top surface and extending between the first end and the second end, wherein the bottom surface is defined by a concave shape or a convex shape in a side profile thereof to provide for managing wire disposed in the rail segment.

46. The clamp assembly according to claim 42, wherein the rail nut further includes:
a bottom surface opposite the top surface and extending between the first end and the second end, wherein the bottom surface has a thin protruding wall to provide for managing wire disposed in the rail segment.

47. The clamp assembly according to claim 42, wherein the rail nut is a bonding washer.

48. The clamp assembly according to claim 47, wherein the bonding washer includes one or more protrusions disposed in the top surface configured to electrically bond with at least one of the first solar panel module and the second solar panel module.

* * * * *